United States Patent
Zhou et al.

(10) Patent No.: US 12,219,528 B2
(45) Date of Patent: Feb. 4, 2025

(54) METHOD AND APPARATUS FOR TRANSMITTING CONTROL INFORMATION, ELECTRONIC DEVICE, AND STORAGE MEDIUM

(71) Applicant: Samsung Electronics Co., Ltd., Suwon-si (KR)

(72) Inventors: Miao Zhou, Beijing (CN); Feifei Sun, Beijing (CN); Min Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 17/442,394

(22) PCT Filed: Mar. 26, 2020

(86) PCT No.: PCT/KR2020/004152
§ 371 (c)(1),
(2) Date: Sep. 23, 2021

(87) PCT Pub. No.: WO2020/197300
PCT Pub. Date: Oct. 1, 2020

(65) Prior Publication Data
US 2022/0167313 A1 May 26, 2022

(30) Foreign Application Priority Data

Mar. 26, 2019 (CN) .......................... 201910234826.7
Sep. 26, 2019 (CN) .......................... 201910919585.X

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/20* (2023.01)

(58) Field of Classification Search
CPC ... H04L 5/0048; H04L 5/0051; H04L 5/0053; H04L 5/0094; H04L 5/0037;
(Continued)

(56) References Cited

U.S. PATENT DOCUMENTS 11,825,297 B2 * 11/2023 Li .......................... H04W 72/25
2018/0206260 A1   7/2018 Khoryaev et al.
(Continued)

FOREIGN PATENT DOCUMENTS

CN  106550318 A    3/2017
EP  3 355 643 A1   8/2018
(Continued)

OTHER PUBLICATIONS

Indian Office Action Aug. 10, 2023, issued in Indian Application No. 202117043291.
(Continued)

*Primary Examiner* — Stephen J Clawson
(74) *Attorney, Agent, or Firm* — Jefferson IP Law, LLP

(57) ABSTRACT

The present disclosure provides a method and an apparatus for transmitting control information, an electronic device and a storage medium. The method includes determining at least one PSCCH candidate on the selected at least one PSCCH resource when performing sidelink communication; and transmitting the PSCCH on the determined at least one PSCCH candidate. The technical solution of the present disclosure can fully utilize the control channel resources for transmitting the SCI in the V2X resource pool, so that when the same data resource is used for the sidelink transmission of different UEs, the degree of conflict of control messages
(Continued)

Determining at least one PSCCH candidate on the selected at least one PSCCH resource when performing sidelink communication — S501

Transmitting the PSCCH on the determined at least one PSCCH candidate — S502 between the UEs is reduced, and the negative impact of conflicts caused by different UE on performance is effectively improved, thereby improving the decoding performance of the sidelink control information.

15 Claims, 8 Drawing Sheets

(51) Int. Cl.
  *H04W 72/0453* (2023.01)
  *H04W 72/20* (2023.01)
(58) Field of Classification Search
  CPC ........ H04L 5/0044; H04W 4/40; H04W 4/44; H04W 4/46; H04W 4/70; H04W 72/02; H04W 72/0446; H04W 72/0453; H04W 72/20; H04W 72/12; H04W 72/25; H04W 72/27; H04W 72/29; H04W 72/40
  See application file for complete search history.

(56) References Cited

U.S. PATENT DOCUMENTS

| | | | |
|---|---|---|---|
| 2018/0234220 A1* | 8/2018 | Yasukawa | H04W 72/04 |
| 2019/0090293 A1* | 3/2019 | Su | H04W 76/14 |
| 2019/0098617 A1 | 3/2019 | Li et al. | |
| 2019/0173612 A1 | 6/2019 | Kimura et al. | |
| 2020/0029318 A1* | 1/2020 | Guo | H04L 1/1822 |
| 2020/0084811 A1* | 3/2020 | Uchiyama | H04W 72/53 |
| 2020/0205165 A1* | 6/2020 | Huang | H04L 1/1854 |
| 2020/0266857 A1* | 8/2020 | Hwang | H04L 1/1864 |
| 2020/0288435 A1* | 9/2020 | Kwak | H04L 5/0094 |
| 2020/0296783 A1* | 9/2020 | Su | H04W 56/0015 |
| 2020/0336253 A1* | 10/2020 | He | H04W 72/23 |
| 2021/0136699 A1* | 5/2021 | Scholand | H04W 4/40 |
| 2021/0258764 A1* | 8/2021 | Zhang | H04W 72/20 |
| 2021/0297221 A1* | 9/2021 | Lee | H04L 1/1812 |
| 2021/0360590 A1* | 11/2021 | Lee | H04L 5/001 |
| 2021/0391894 A1* | 12/2021 | Yu | H04W 4/40 |
| 2022/0086803 A1* | 3/2022 | Li | H04W 72/0446 |
| 2022/0116929 A1* | 4/2022 | Wang | H04W 72/20 |
| 2022/0124683 A1* | 4/2022 | Zhao | H04W 72/56 |
| 2022/0159583 A1* | 5/2022 | Wang | H04L 5/0051 |
| 2022/0159694 A1* | 5/2022 | Peng | H04L 5/0053 |
| 2022/0271892 A1* | 8/2022 | Peng | H04L 5/0094 |
| 2022/0272682 A1* | 8/2022 | Hahn | H04L 5/00 |
| 2022/0377764 A1* | 11/2022 | Choi | H04L 1/1816 |
| 2023/0084917 A1* | 3/2023 | Li | H04W 28/0215 370/329 |
| 2023/0300815 A1* | 9/2023 | Li | H04W 52/242 455/522 |

FOREIGN PATENT DOCUMENTS

| | | |
|---|---|---|
| WO | 2018/030185 A1 | 2/2018 |
| WO | 2018/135905 A1 | 7/2018 |
| WO | 2018/174661 A1 | 9/2018 |

OTHER PUBLICATIONS

Ericsson: "On 2-stage PSCCH design", R1-1813648, 3GPP TSG-RAN WG1 Meeting #95 Spokane, WA, US, Nov. 12-16, 2018.
ZTE et al., "Discussion on NR sidelink physical layer structure", R1-1812731, 3GPP TSG RAN WG1 Meeting #95 Spokane, USA, Nov. 12-16, 2018.
Extended European Search Report dated Oct. 24, 2022, issued in European Patent Application No. 20777194.0.
Spreadtrum Communications, "Discussion on NR sidelink physical layer structure," R1-1900713, 3GPP TSG RAN WG1 Ad-Hoc Meeting 1901, Taipei, Jan. 12, 2019.
Huawei et al., "Sidelink physical layer structure for NR V2X," R1-1901536, 3GPP TSG RAN WG1 Meeting #96, Athens, Greece, Feb. 15, 2019.
Chinese Office Action dated Mar. 12, 2024, issued in Chinese Application No. 201910919585.X.
Hearing Notice dated Apr. 24, 2024, issued in Indian Application No. 202117043291.
Notice Of Allowance dated May 16, 2024, issued in Chinese Application No. 201910919585.X.

* cited by examiner

[Fig. 1]
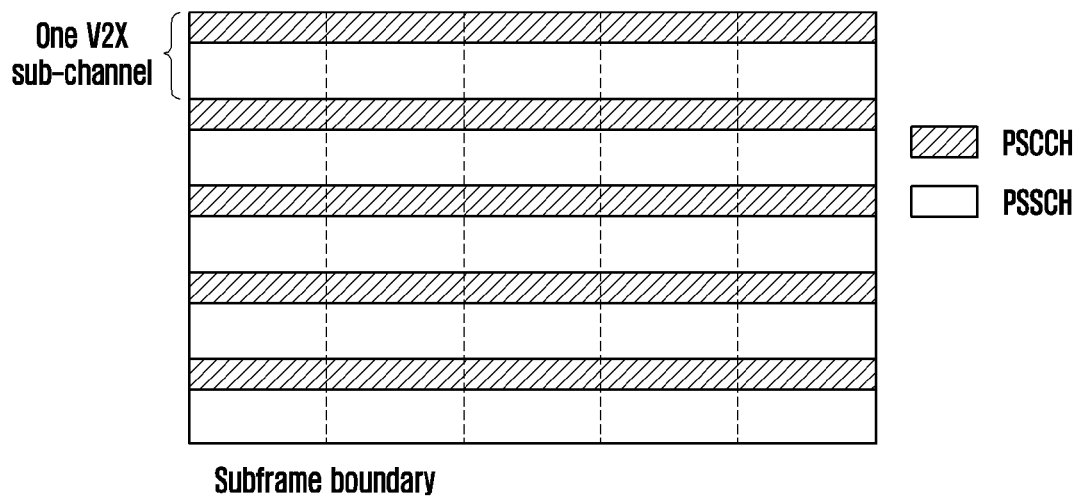
[Fig. 2]
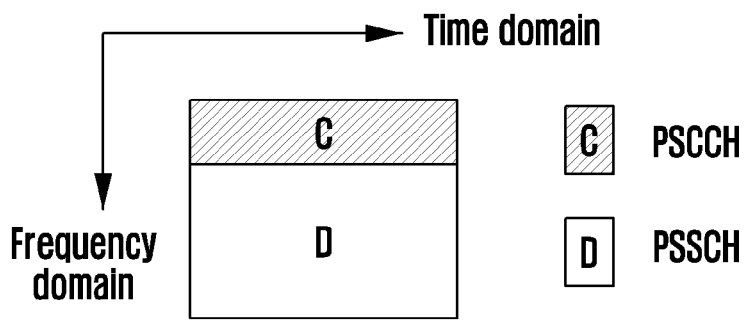
[Fig. 3]
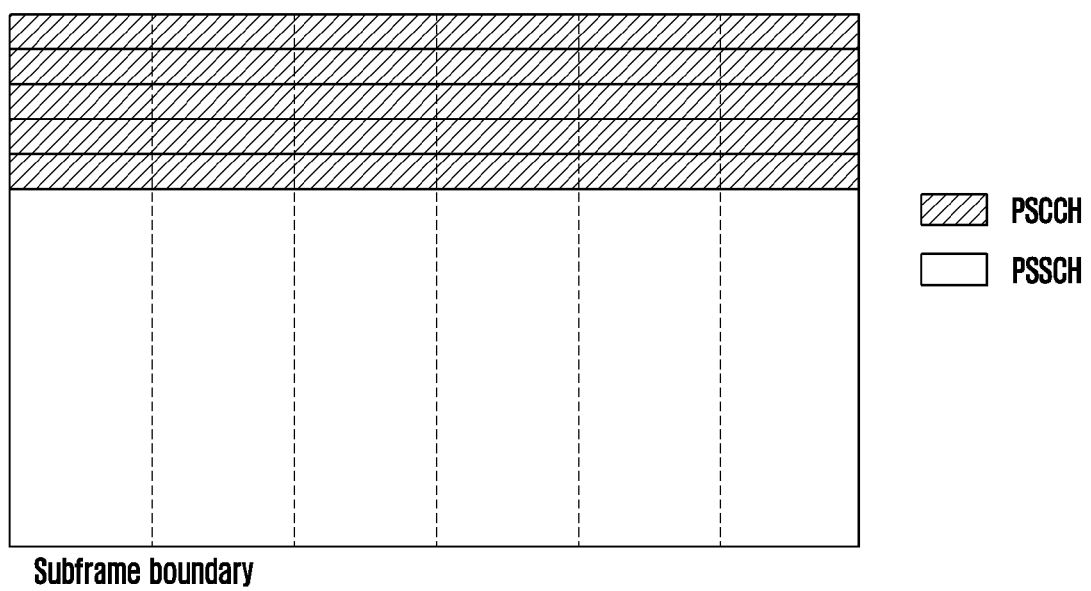

[Fig. 4]
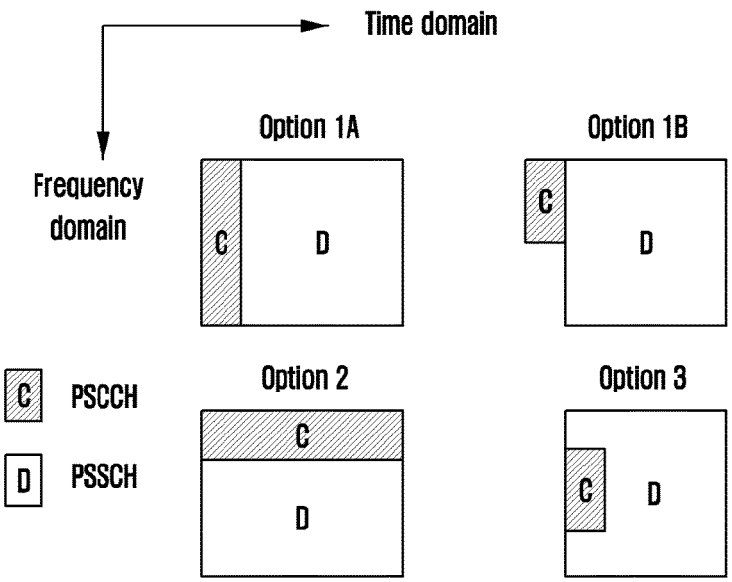
[Fig. 5]
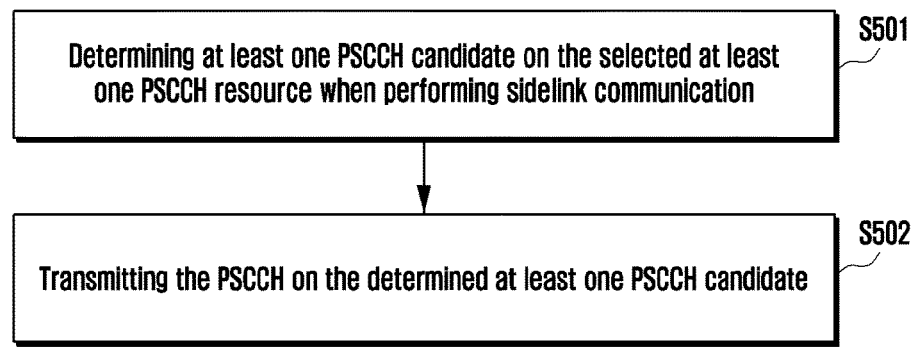
[Fig. 6]
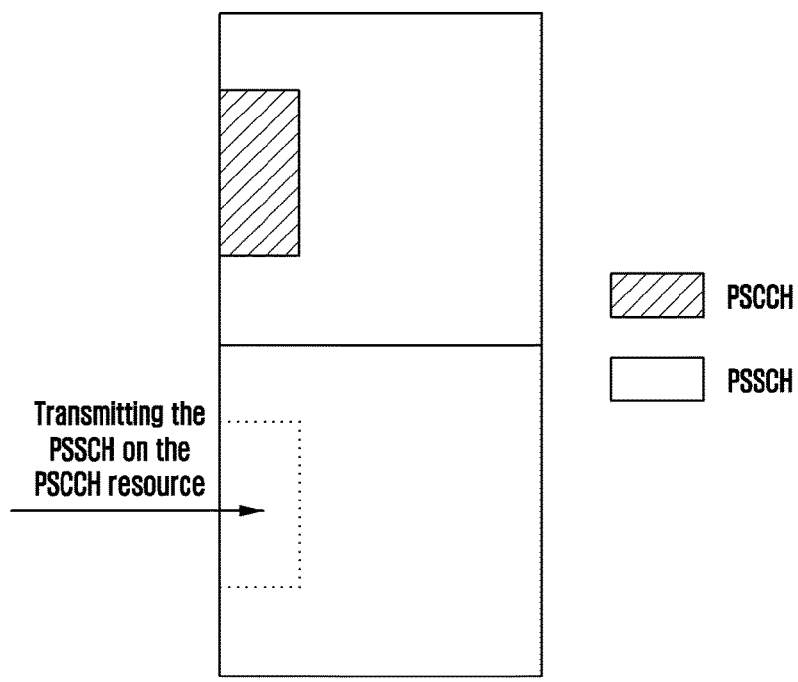

[Fig. 7A]
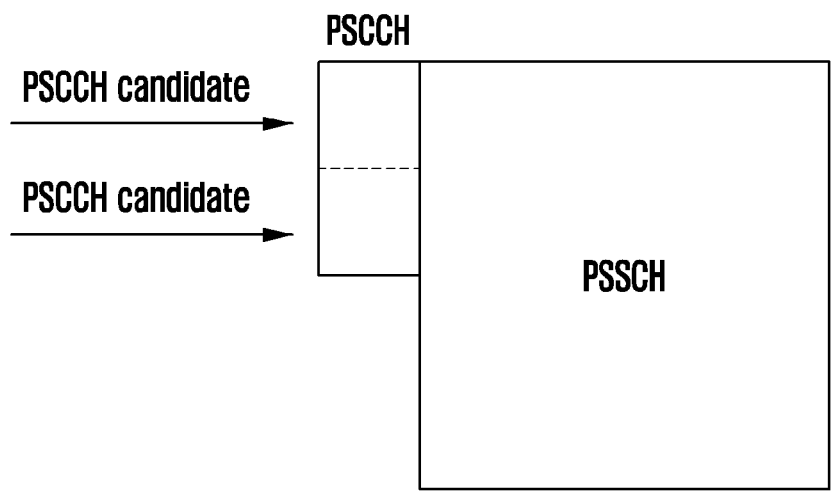
[Fig. 7B]
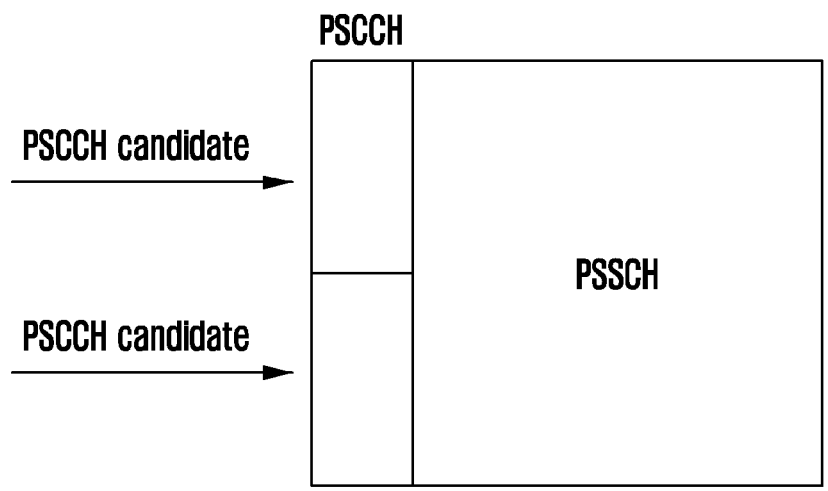

[Fig. 8]
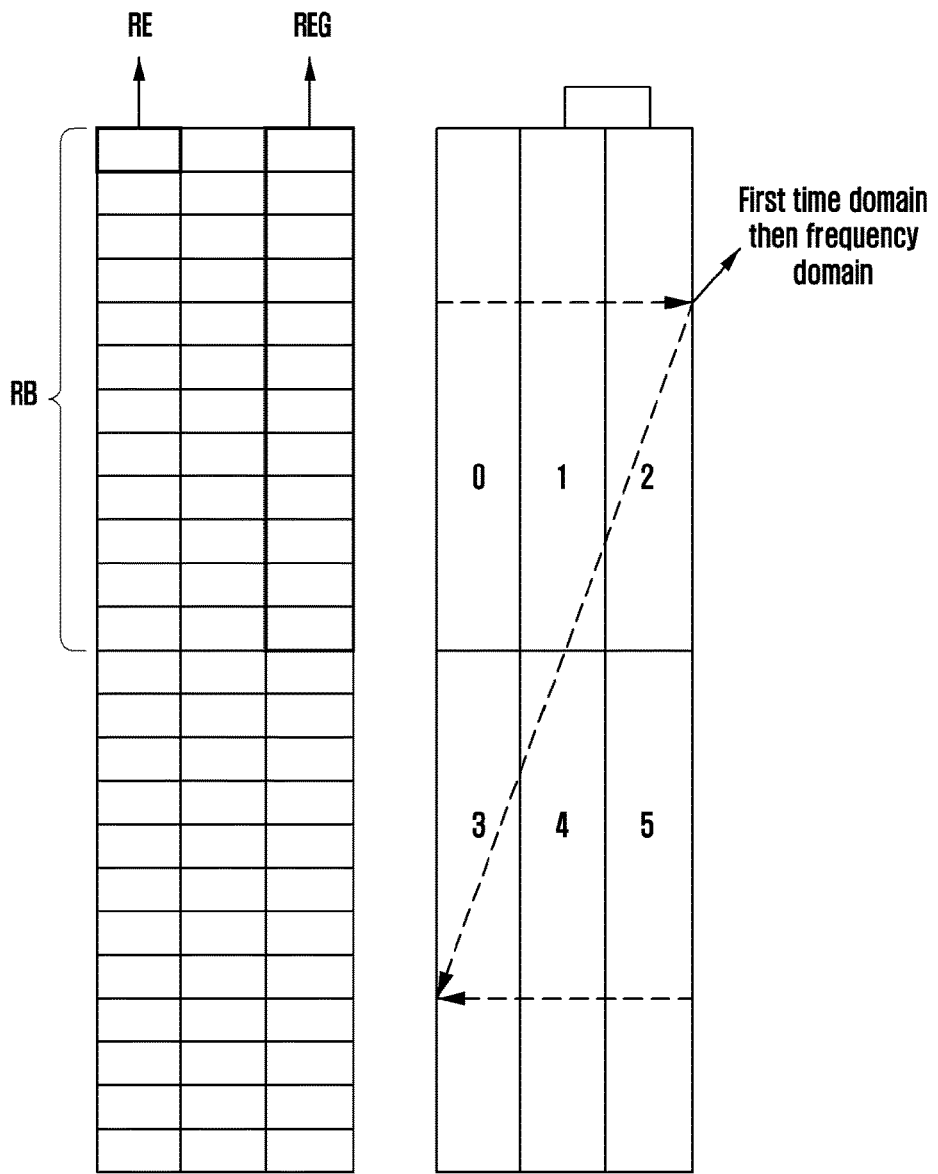
[Fig. 9A]
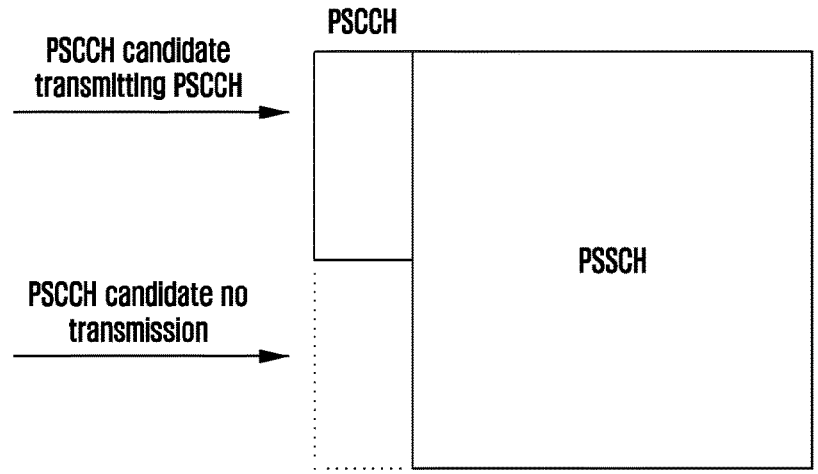

[Fig. 9B]
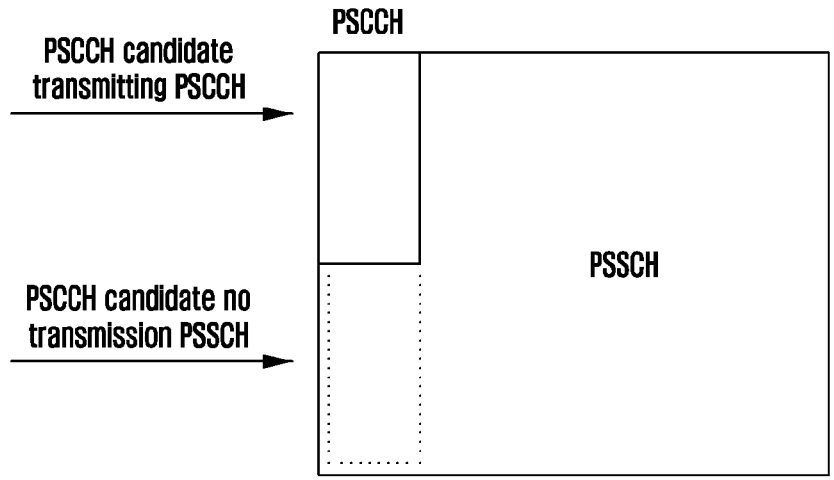
[Fig. 10]
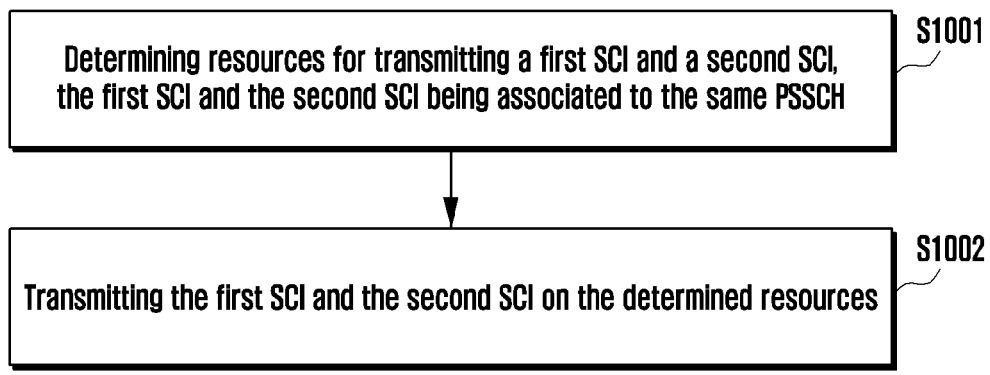
[Fig. 11A]
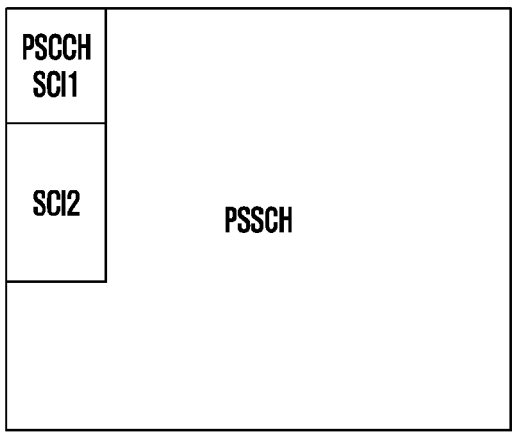

[Fig. 11B]
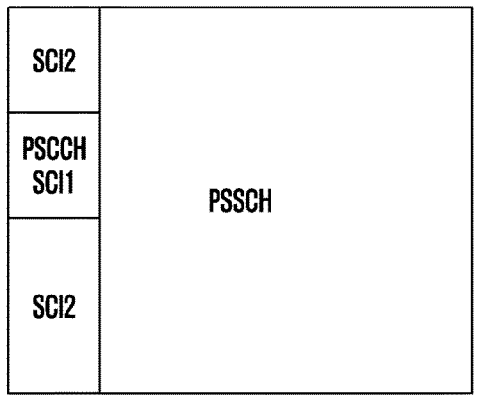
[Fig. 11C]
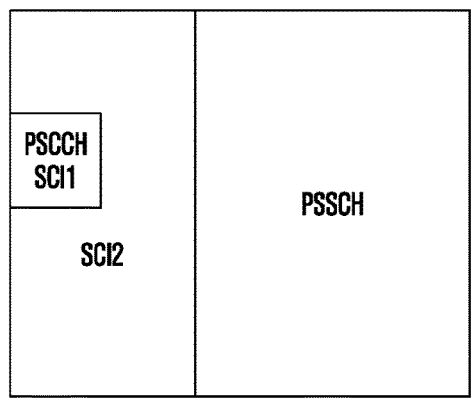
[Fig. 11D]
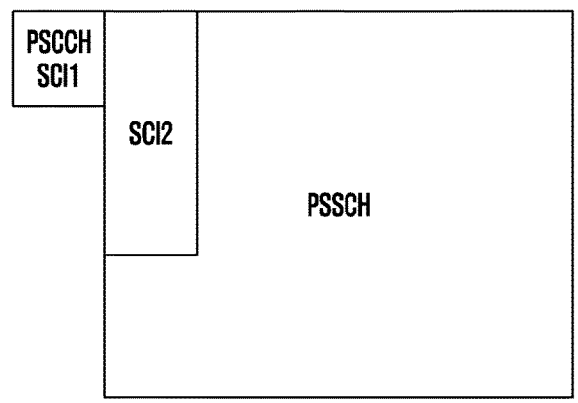
[Fig. 12]
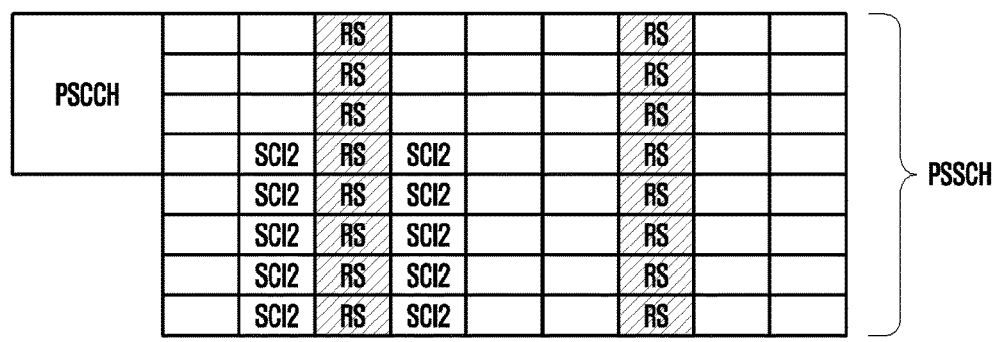

[Fig. 13]
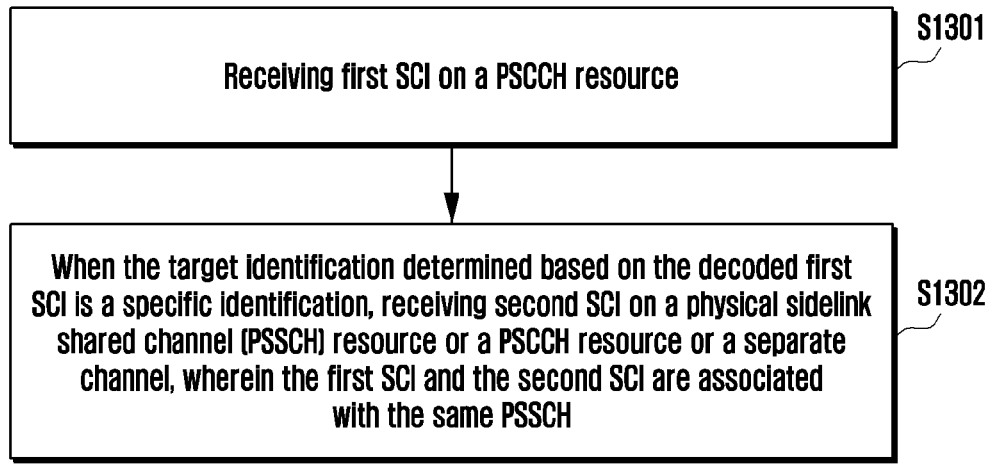
[Fig. 14]
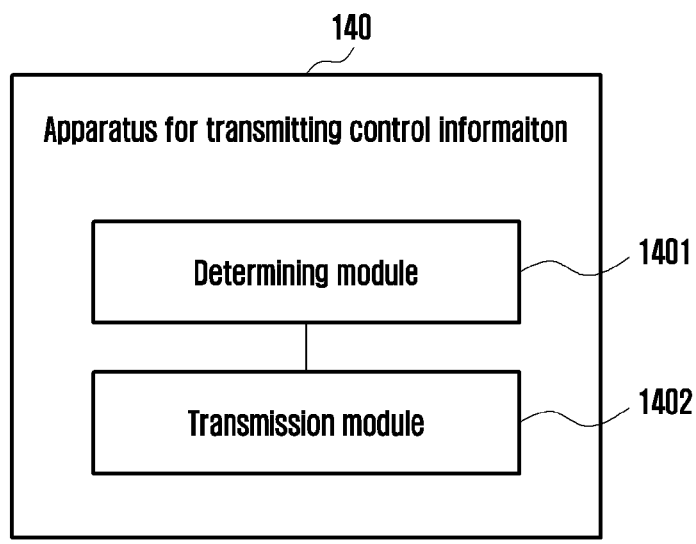
[Fig. 15]
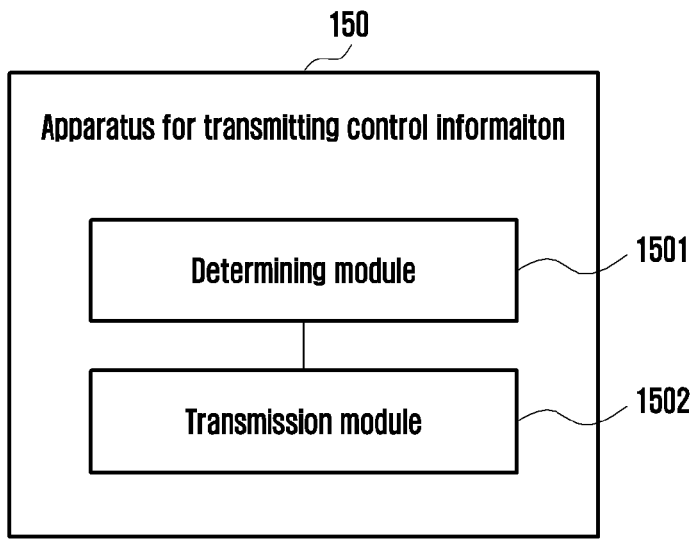

[Fig. 16]
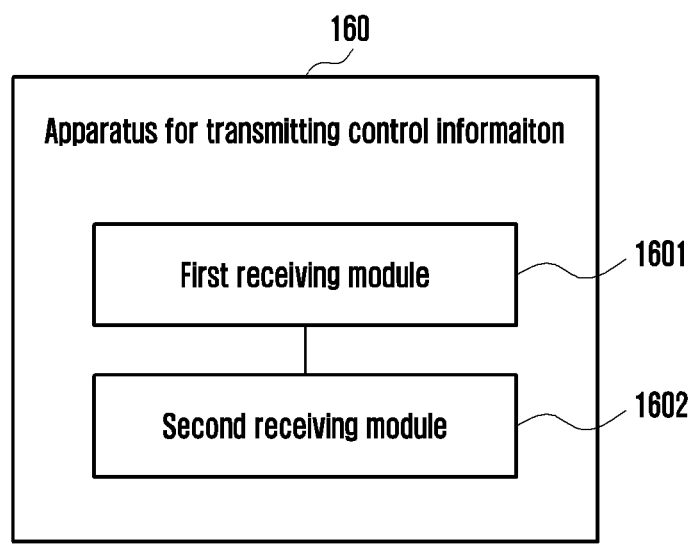

METHOD AND APPARATUS FOR TRANSMITTING CONTROL INFORMATION, ELECTRONIC DEVICE, AND STORAGE MEDIUM

TECHNICAL FIELD

The present disclosure relates to a field of wireless communication technologies, and particularly relates to a method and an apparatus for transmitting control information, an electronic device, and a storage medium.

BACKGROUND ART

In the Long-Term Evolution (LTE) technology, the sidelink communication includes two kinds of main mechanisms: direct communication of device to device (D2D) and Vehicle to Vehicle/Infrastructure/Pedestrian/Network (hereinafter referred to as V2X). V2X is designed based on D2D technology, which is superior to D2D in terms of data rate, latency, reliability and link capacity, and is the most representative sidelink communication technology in LTE technology.

In the LTE V2X system, the sidelink communication also defines different physical channels, including a Physical Sidelink Control Channel (PSCCH) and a Physical Sidelink Shared Channel (PSSCH). The PSSCH is used to carry data, and the PSCCH is used to carry the Sidelink Control Information (SCI), wherein the SCI indicates information such as the time-frequency domain resource location of the associated PSSCH transmission, modulation and coding scheme, and the receiving target ID (also referred to as destination ID) for the PSSCH, and the like. The sidelink communication also defines a sub-channel as a minimum unit of resource allocation, and one sub-channel includes a control channel resource or a data channel resource, or including both.

The LTE V2X system includes two modes in term of resource allocation: a resource allocation mode based on base station scheduling (Mode 3) and a resource allocation mode self-selected by the UE (Mode 4). Both modes are performed based on sub-channels defined in the sidelink system, and the base station schedules or the UE autonomously selects several control and/or data sub-channels for sidelink transmission. When the sidelink transmission occupies a sub-channel including control channel resources, the SCI uses all control channel resources in the sub-channel; when the sidelink transmission occupies multiple sub-channels including control channel resources, the SCI uses all control channel resources in one of the sub-channels according to predefined criteria.

The 5G NR (New Radio) system, which is as an evolution technology of LTE, correspondingly also includes a further evolution of the sidelink communication, and the concepts of PSCCH and PSSCH are similarly introduced in the NR V2X. The current multiplexing method of PSSCH and PSCCH mainly includes: the PSCCH and the PSSCH using non-overlapped time domain resources, the frequency domain resources of the PSCCH and the PSSCH being the same or different; the PSCCH and the PSSCH using non-overlapped frequency domain resources, and the time domain resources of the PSCCH and the PSSCH being the same; or a portion of the PSCCH and the PSSCH using the resources which are overlapped in time domain and are not overlapped in frequency domain, and the other portion of the PSSCH and/or the PSCCH using non-overlapped time domain resources. The sub-channels of the NR V2X would be designed based on the multiplexing method of the PSSCH and the PSCCH.

DISCLOSURE OF INVENTION

Technical Problem

In the prior art, when two different UEs select the same sub-channel for transmitting the SCI, since each UE uses all control channel resources in the sub-channel for transmission, the SCI transmission of the two UEs would occur conflict, which causes a serious negative impact on the decoding performance. Especially when the two UEs are far away from a receiving terminal, the signal of the closer UE will completely cover the signal of the far UE due to the near-far effect, and it causes that the signal of the far UE cannot be decoded.

Solution to Problem

In order to overcome the above technical problems or at least partially solve the above technical problems, the following technical solutions are provided as follows.

According to a first aspect of the disclosure, the present disclosure provides a method for transmitting control information, wherein each of physical sidelink control channel (PSCCH) resources includes at least one PSCCH candidate, and the method comprises: determining at least one PSCCH candidate on the selected at least one PSCCH resource when performing sidelink communication; transmitting the PSCCH on the determined at least one PSCCH candidate.

In an optional implementation manner, the method further includes: transmitting a PSSCH associated with the PSCCH on the selected at least one physical sidelink shared channel (PSSCH) resource; wherein, the selected at least one PSSCH resource and the selected at least one PSCCH resource are independent or associated with each other.

In an optional implementation manner, wherein, the selected at least one PSSCH resource and the selected at least one PSCCH resource are independent or associated with each other, comprising: wherein the selected at least one PSSCH resource and the selected more than one PSCCH resource are associated with each other.

In an optional implementation manner, the method further includes: transmitting the PSSCH associated with the PSCCH on the PSCCH candidates other than the determined at least one PSCCH candidate.

In an optional implementation manner, the determining the at least one PSCCH candidate on the selected at least one PSCCH resource further includes: determining at least one PSCCH candidate on the selected at least one PSCCH resource based on at least one piece of the following information: UE identification, radio network temporary identity (RNTI), reference signal configuration, sidelink transmission being first transmission or $N^{th}$ retransmission, redundancy version, geographic location information, channel detection result, scheduling information sent by the base station, scheduling information sent by other UEs, where N is a natural number.

In an optional implementation manner, the reference signal configuration includes at least one of the following: a demodulation reference signal (DMRS) antenna port, a DMRS pattern, DMRS scrambling information, DMRS cyclic shift, CSI-RS configuration information, PT-RS configuration information, and configuration information of other reference signals dedicated to sidelink channel measurement.

In an optional implementation, the reference signal configuration is a reference signal configuration used by the PSCCH and/or the PSSCH.

In an optional implementation manner, the method further includes: transmitting a DMRS corresponding to the PSSCH on the determined PSSCH resources.

In an optional implementation manner, the method further includes: transmitting the DMRS corresponding to the PSCCH by at least one of the following ways:
transmitting on the determined at least one PSCCH candidate; transmitting on all of the PSCCH candidates in the PSCCH sub-channel corresponding to the determined at least one PSCCH candidate; transmitting on all of the PSCCH candidates in the at least one PSCCH resource corresponding to the determined at least one PSCCH candidate; and transmitting on all of the PSCCH candidates in the selected at least one PSCCH resource.

In an optional implementation manner, each of PSCCH resources comprises at least one of the following: a first set of PSCCH candidates, the first set of PSCCH candidates comprising at least one PSCCH candidate; at least one PSCCH sub-channel; a PSCCH resource using at least one of following predefined or configured items: time domain resource size, frequency domain resource size, time domain resource location, frequency domain resource location; at least one control channel element (CCE); and at least one resource element group (REG).

In an optional implementation manner, when each of PSCCH resources comprises at least one PSCCH sub-channel, each PSCCH sub-channel comprises a second set of PSCCH candidates, the second set of PSCCH candidates comprises at least one PSCCH candidate.

In an optional implementation manner, when the size of one PSCCH sub-channel is M resource blocks (RBs) in the frequency domain and L symbols in the time domain, the size of each PSCCH candidate is M/X RBs in the frequency domain and L symbols in the time domain, or the size of each PSCCH candidate is M/X*k RBs in the frequency domain and L/k symbols in the time domain, where X represents the number of PSCCH candidates included in one PSCCH sub-channel, k represents the number of PSCCH candidates for frequency division multiplexing (FDM) on the same time domain resource in one PSCCH sub-channel.

In an optional implementation manner, the determining the at least one PSCCH candidate on the selected one PSCCH resource according to the DMRS antenna port includes: according to the DMRS antenna port S, the $Y_0^{th}$ of the Y PSCCH candidates in the selected one PSCCH sub-channel is used as the determined PSCCH candidate, wherein the mapping relationship between $Y_0$ and S is predefined.

In an optional implementation manner, when the Y PSCCH candidates in the selected one PSCCH sub-channel are FDM, transmitting the PSCCH on the determined at least one PSCCH candidate includes: when the PSCCH is transmitted on the determined $Y_0^{th}$ PSCCH candidate, the following frequency domain resources of the selected one PSCCH sub-channel are used:

$$RB\#m+(Y_0-1)*P \sim RB\#m+Y_0*P-1$$

Wherein the frequency domain granularity of each PSCCH candidate is P RBs, and RB#m is the starting RB of the one PSCCH sub-channel, and RB#m+($Y_0$−1)*P~RB#m+$Y_0$*P−1 represents that the range of frequency domain resources used is RB#m+($Y_0$−1)*P to RB#m+$Y_0$*P−1.

In an optional implementation manner, when determining at least one PSCCH candidate on the selected at least one PSCCH resource according to the DMRS antenna port and/or the DMRS pattern, transmitting the DMRS corresponding to the PSCCH includes: transmitting DMRS corresponding to the DMRS antenna port and/or DMRS pattern.

According to a second aspect of the present disclosure, the present disclosure provides a method for transmitting control information, the method includes: determining resources for transmitting first sidelink control information (SCI) and second SCI, the first SCI and the second SCI being associated to the same physical sidelink shared channel (PSSCH); and transmitting the first SCI and the second SCI on the determined resources.

In an optional implementation manner, the determining resources for transmitting the first SCI and the second SCI includes any one of the following: determining that the resource for transmitting the first SCI is a PSCCH resource, and the resource for transmitting the second SCI is a PSSCH resource; determining that the resource for transmitting the first SCI and the second SCI are PSCCH resources; determining that the resource for transmitting the first SCI is a PSCCH resource, and the resource for transmitting the second SCI is a separate channel.

In an optional implementation manner, when the determining that the resource for transmitting the second SCI is the PSSCH resource, the transmitting the second SCI on the determined resource includes any one of the following: mapping respectively the second SCI and the PSSCH associated with the second SCI onto the determined PSSCH resources and using non-overlapped resource locations, and transmitting the second SCI and the PSSCH associated with the second SCI on the determined PSSCH resources; mapping the second SCI onto the PSSCH resource carrying the PSSCH associated with the second SCI, and transmitting the second SCI on the PSSCH resource carrying the PSSCH associated with the second SCI, wherein the resource that corresponds to the resource location of the second SCI on the PSSCH resource carrying the PSSCH associated with the second SCI is punctured.

In an optional implementation, the mapping respectively the second SCI and the PSSCH associated with the second SCI onto the determined PSSCH resources includes: mapping the second SCI onto the determined PSSCH resources, and rate matching the PSSCH associated with the second SCI to other PSSCH resources among the determined PSSCH resources that are not used to transmit the second SCI based on at least one manner of the following: the order of first the frequency domain then the time domain; the order of first the time domain then the frequency domain; and a predetermined pattern.

In an optional implementation manner, the resource location for mapping the second SCI and the resource location of the first SCI are fully or partially time division multiplexing (TDM) and/or frequency division multiplexing (FDM).

In an optional implementation manner, the mapping the second SCI onto the PSSCH resource carrying the PSSCH associated with the second SCI includes: mapping the second SCI onto a predefined resource element (RE), a resource element group (REG) or a symbol.

In an optional implementation manner, when the determining that the resource for transmitting the first SCI and the second SCI are PSCCH resources, the transmitting the first SCI and the second SCI on the determined resource includes any one of the following: mapping respectively the first SCI and the second SCI onto the determined PSCCH resources and using non-overlapped resource locations, and transmitting the first SCI and the second SCI on the determined PSCCH resources; mapping the second SCI onto the PSCCH resource carrying the first SCI, and transmitting the second SCI on the PSCCH resource carrying the first SCI, wherein the resource that corresponds to the resource location of the second SCI on the PSSCH resource carrying the first SCI is punctured; and mapping the first SCI onto the PSCCH resource carrying the second SCI, and transmitting the first SCI on the PSCCH resource carrying the second SCI, wherein the resource that corresponds to the resource location of the first SCI on the PSSCH resource carrying the second SCI is punctured.

In an optional implementation manner, the determined PSCCH resources comprises at least one PSCCH resource, each PSCCH resource comprises at least one PSCCH candidate, and the transmitting the first SCI and the second SCI on the determined PSCCH resources includes: transmitting the first SCI on at least one PSCCH candidate among the determined PSCCH resources; transmitting the second SCI on other PSCCH resources that are not used to transmit the first SCI among the determined PSCCH resources.

In an optional implementation manner, the transmitting the second SCI on the other PSCCH resources that are not used to transmit the first SCI among the determined PSCCH resources, includes: transmitting the second SCI on at least one of the other PSCCH candidates that are not used to transmit the first SCI among the determined PSCCH resources.

In an optional implementation, the resource for transmitting the first SCI and the resource for transmitting the second SCI are independent or associated with each other.

In an optional implementation manner, when the resource for transmitting the first SCI and the resource for transmitting the second SCI are associated with each other, the determining the resource for transmitting the first SCI and the second SCI includes: deriving the resource for transmitting the second SCI based on the resource for transmitting the first SCI.

In an optional implementation manner, the resource location of the separate channel for carrying the second SCI and the resource location of the first SCI are TDM and/or FDM; and/or the resource location of the separate channel for carrying the second SCI and the resource location of the PSSCH associated with the second SCI are TDM and/or FDM.

In an optional implementation manner, at least one of a time domain resource location, a frequency domain resource location, a time domain resource size, and a frequency domain resource size of a PSCCH resource used for transmitting the SCI is configured by a base station or a higher layer; or, at least one of a time domain resource location, a frequency domain resource location, a time domain resource size, and a frequency domain resource size of a PSCCH resource used for transmitting an SCI is derived according to a sub-channel configuration, wherein the sub-channel configuration further includes a PSCCH sub-channel configuration and/or PSSCH sub-channel configuration; or, at least one of a time domain resource location, a frequency domain resource location, a time domain resource size, and a frequency domain resource size of a PSCCH resource used for transmitting the SCI is predefined.

In an optional implementation manner, at least one of a time domain resource location, a frequency domain resource location, a time domain resource size, and a frequency domain resource size of a PSCCH resource used for transmitting an SCI configured by a base station or a higher layer is a portion of resource pool configuration, or is independent of the resource pool configuration.

According to a third aspect of the present disclosure, the present disclosure provides a method for receiving control information, the method includes: receiving first SCI on a PSCCH resource; and when the target identification determined based on a decoded first SCI is a specific identification, receiving second SCI on a PSSCH resource or a PSCCH resource or a separate channel, wherein the first SCI and the second SCI are associated with the same PSSCH.

In an optional implementation manner, the specific identification is at least one identification configured by the higher layer or a pre-configured physical layer identification.

In an optional implementation manner, the receiving the second SCI on the PSSCH resource or the PSCCH resource or the separate channel includes: determining a resource for receiving the second SCI based on the resource of the received first SCI, and receiving the second SCI on the determined resource for receiving the second SCI.

According to a fourth aspect of the disclosure, the present application provides an apparatus for transmitting control information, wherein each of PSCCH resources comprises at least one PSCCH candidate, and the apparatus includes: a determining module configured to determine at least one PSCCH candidate on the selected at least one PSCCH resource when performing sidelink communication; and a transmission module configured to transmit the PSCCH on the determined at least one PSCCH candidate.

According to a fifth aspect of the present disclosure, the present disclosure provides an apparatus for transmitting control information, the apparatus includes: a determining module configured to determine resources for transmitting first SCI and second SCI, the first SCI and the second SCI being associated to the same PSSCH; and a transmission module configured to transmit the first SCI and the second SCI on the determined resources.

According to a sixth aspect of the present disclosure, the present disclosure provides an apparatus for receiving control information, the apparatus includes: a first receiving module configured to receive first SCI on a PSCCH resource; and a second receiving module configured to: when the target identification determined based on a decoded first SCI is a specific identification, receiving second SCI on a PSSCH resource or a PSCCH resource or a separate channel, wherein the first SCI and the second SCI are associated with the same PSSCH.

According to a seventh aspect of the present disclosure, the present disclosure provides an electronic device, the electronic device includes: a processor and a memory, the memory stores at least one instruction, at least one program, a code set or an instruction set, the at least one instruction, the at least one program, the code set or the instruction set is loaded and executed by the processor to implement the method of the first or second or third aspect of the present disclosure.

According to an eighth aspect of the present disclosure, the present disclosure provides a computer readable storage medium for storing computer instructions, programs, code sets, or instruction sets that, when executed on a computer, cause the computer to implement the method of the first aspect or the second or third aspect of the present disclosure.

The present disclosure provides a method and an apparatus for transmitting control information, an electronic device and a storage medium. The method includes determining at least one PSCCH candidate on the selected at least one PSCCH resource when performing sidelink communication; and transmitting the PSCCH on the determined at least one PSCCH candidate.

Advantageous Effects of Invention

The technical solution of the present disclosure can fully utilize the control channel resources for transmitting the SCI in the V2X resource pool, so that when the same data resource is used for the sidelink transmission of different UEs, the degree of conflict of control messages between the UEs is reduced, and the negative impact of conflicts caused by different UE on performance is effectively improved, thereby improving the decoding performance of the sidelink control information

BRIEF DESCRIPTION OF DRAWINGS

The accompanying drawings, which are used in the description of the embodiments of the present disclosure, are briefly described below in order to more clearly illustrate the technical solutions in the embodiments of the present disclosure.

FIG. 1 is a schematic diagram of a V2X sub-channel provided by an embodiment of the present disclosure;

FIG. 2 is a schematic diagram of a PSCCH sub-channel and a PSSCH sub-channel resource multiplexing manner according to an embodiment of the present disclosure;

FIG. 3 is a schematic diagram of a PSCCH and PSSCH resource pool provided by an embodiment of the present disclosure;

FIG. 4 is a schematic diagram of a PSCCH resource and a PSSCH resource multiplexing manner according to an embodiment of the present disclosure;

FIG. 5 is a first schematic flowchart of a method for transmitting control information according to an embodiment of the present disclosure;

FIG. 6 is a schematic diagram of transmitting a PSSCH on a PSCCH resource according to an embodiment of the present disclosure;

FIG. 7a is a schematic diagram of a PSCCH candidate division manner according to an embodiment of the present disclosure;

FIG. 7b is a schematic diagram of another PSCCH candidate division manner according to an embodiment of the present disclosure;

FIG. 8 is a schematic diagram of a relationship between a PSCCH candidate and a CCE/REG according to an embodiment of the present disclosure;

FIG. 9a is a first schematic diagram of another PSCCH candidate transmission manner according to an embodiment of the present disclosure;

FIG. 9b is a second schematic diagram of another PSCCH candidate transmission manner according to an embodiment of the present disclosure;

FIG. 10 is a second schematic flowchart of a method for transmitting control information according to an embodiment of the present disclosure;

FIG. 11a is a first schematic diagram of second SCI and a PSSCH associated with the second SCI respectively being mapped onto a selected PSSCH resource according to an embodiment of the present disclosure;

FIG. 11b is a second schematic diagram of the second SCI and the PSSCH associated with the second SCI respectively being mapped onto the selected PSSCH resource according to an embodiment of the present disclosure;

FIG. 11c is a third schematic diagram of the second SCI and the PSSCH associated with the second SCI respectively being mapped onto the selected PSSCH resource according to an embodiment of the present disclosure;

FIG. 11d is a fourth schematic diagram of the second SCI and the PSSCH associated with the second SCI respectively being mapped onto the selected PSSCH resource according to an embodiment of the present disclosure;

FIG. 12 is a schematic diagram of the second SCI being carried on a PSSCH resource carrying the PSSCH associated with the second SCI according to an embodiment of the present disclosure;

FIG. 13 is a schematic flowchart of a method for receiving control information according to an embodiment of the present disclosure;

FIG. 14 is a first schematic structural diagram of an apparatus for transmitting control information according to an embodiment of the present disclosure;

FIG. 15 is a second schematic structural diagram of an apparatus for transmitting control information according to an embodiment of the present disclosure;

FIG. 16 is a schematic structural diagram of an apparatus for receiving control information according to an embodiment of the present disclosure.

MODE FOR THE INVENTION

The embodiments of the present disclosure are described in detail below, and the examples of the embodiments are illustrated in the drawings, wherein throughout the drawings, the same or similar reference numbers are used to depict the same or similar elements or elements having the same or similar functions. The embodiments described below with reference to the accompanying drawings are illustrative, and are only used to explain the present disclosure, rather than being construed as limiting the present disclosure.

Those skilled in the art should understand that the singular forms "a", "an", "said" and "the" include plural referents unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood that when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

The embodiments of the present disclosure will be detailly described below in conjunction with the accompanying drawings in order to make the objects, technical solutions and advantages of the present disclosure more clear.

In the current LTE V2X, all resources that can be used by the sidelink communication system are configured by the concept of the resource pool, and the resources used by each UE to transmit the sidelink data information and the control information are located in the V2X resource pool. The V2X resource pool may be configured to transmit PSCCH and PSSCH on adjacent frequency domain resources or non-adjacent frequency domain resources. For the former, the V2X resource pool is divided into several V2X sub-channels in the frequency domain, and each V2X sub-channel includes one control channel and one data channel, as shown in FIG. 1. Each V2X sub-channel includes one PSCCH sub-channel and one PSSCH sub-channel. The resource multiplexing mode is shown in FIG. 2: one PSCCH sub-channel and one PSSCH sub-channel use the same time domain resource. For convenience of explanation, the set of control channel resources in all V2X sub-channels is referred to as a PSCCH resource pool, and the set of data channel resources in all V2X sub-channels is referred to as a PSSCH resource pool. For the latter, the V2X resource pool is divided into a PSCCH resource pool and a PSSCH resource pool in the frequency domain, and the PSCCH resource pool and the PSSCH resource pool have same time domain resources and their frequency domain resources are non-overlapped. The PSCCH resource pool and the PSSCH resource pool are respectively divided into several PSCCH sub-channels and PSSCH sub-channels in the frequency domain, as shown in FIG. 3.

For the NR V2X system, in the prior art, for a specific control message and a data message associated therewith, the PSCCH resource and the PSSCH resource used by the specific control message and the data message have several possible multiplexing modes as shown in FIG. 4:

Option 1: the PSCCH and its associated PSSCH are transmitted on non-overlapped time domain resources, including Option 1A and Option 1B: Option 1A: the frequency domain resources used for the PSCCH and the PSSCH associated therewith are the same; Option 1B: the frequency domain resources used for the PSCCH and the PSSCH associated therewith are different.

Option 2: the PSCCH and the PSSCH associated therewith use same time domain resources and use non-overlapped frequency domain resources for transmission in all time domain resources used for transmission.

Option 3: a portion of the PSCCHs and the associated PSSCHs are transmitted by using overlapped time domain resources on non-overlapped frequency domain resources, and another portion of the associated PSSCHs and/or another portion of the PSCCHs are transmitted by using non-overlapped time domain resources.

When resource scheduling or resource selection is performed in NR V2X, similarly to LTE, it may use a similar mechanism to divide the V2X resource pool into several PSCCH sub-channels and PSSCH sub-channels, for example, each content shown in each option of FIG. 4 is one V2X sub-channel, including one PSCCH sub-channel and one PSSCH sub-channel.

In the current LTE V2X system, when the UE occupies one PSCCH sub-channel to transmit the control message, all time-frequency resources of the PSCCH sub-channels in the corresponding subframe are used to transmit the control message. Therefore, the two UEs select the same PSCCH sub-channel to transmit the control message, the resource locations of the control messages of the two are completely overlapped. In the embodiment of the present disclosure, for the NR V2X system, in order to further improve the decoding performance of the control message when the resources conflict, the resources may be further divided in one PSCCH sub-channel, the overlapped degree of control message resources during conflicts is reduced by the UE selecting different divided PSCCH resources.

Based on that, the embodiment of the present disclosure provides a design of a sub-channel and a control channel in the sidelink communication. Specifically, there are multiple PSCCH resources and multiple PSSCH resources in a sidelink resource pool, where the definition of each PSCCH resource includes at least one of the following:

(1) a first set of PSCCH candidates

That is, each PSCCH resource is defined by a first set of PSCCH candidates, and the first set of PSCCH candidates include at least one PSCCH candidate.

(2) at least one PSCCH sub-channel includes the following implementations:

First, a PSCCH resource is a PSCCH sub-channel, similarly, a PSSCH resource is a PSSCH sub-channel.

Second, a V2X sub-channel includes one PSSCH sub-channel and at least one PSCCH sub-channel, and a PSCCH resource may be one PSCCH sub-channel or all PSCCH sub-channels in one V2X sub-channel, and a PSSCH resource may be one PSSCH sub-channel.

(3) a PSCCH resource using at least one of following predefined or configured items: time domain resource size, frequency domain resource size, time domain resource location, frequency domain resource location.

That is, the time domain resource size and the frequency domain resource size of each PSCCH resource may correspond to the granularity in the time domain and the frequency domain of the PSCCH resource, respectively, or the time domain resource size of each PSCCH resource is the granularity in the time domain of the PSCCH resource, the frequency domain size is the granularity in the frequency domain of the PSSCH resource or the frequency domain size of the PSSCH sub-channel. As an example, the time domain resource size of one PSCCH resource is an integer multiple of the granularity in the time domain of the PSCCH resource, and the frequency domain size is an integer multiple of the granularity or size in the frequency domain of the PSCCH resource/PSSCH resource/PSCCH sub-channel/PSSCH sub-channel.

(4) at least one control channel element (CCE);

That is, each PSCCH resource is composed of one or more CCEs, the one or more CCEs may be continuous or discontinuous in the time domain and/or the frequency domain; for example, one PSCCH resource is all CCEs on a given time-frequency resource, all CCEs may be continuous or discontinuous in the time domain and/or frequency domain; for another example, one PSCCH resource is multiple CCEs distributed according to a specific pattern, the pattern may be continuous or discontinuous in the time domain and/or the frequency domain.

(5) at least one resource-element group (REG).

In this solution, each PSCCH resource is one CCE, and the CCE includes at least one REG.

In the embodiment of the present disclosure, for any of the foregoing resource division manners, each PSCCH resource includes at least one PSCCH candidate. For a case where one PSCCH resource is one PSCCH sub-channel, the PSCCH sub-channel may include a second set of PSCCH candidates, that is, the PSCCH sub-channel is defined by a second set of PSCCH candidates, where the second set of PSCCH candidates includes at least one PSCCH candidate. Or, for a case where one PSCCH resource includes all (which may be one or more) PSCCH sub-channels in one V2X sub-channel, each PSCCH sub-channel includes a second set of PSCCH candidates, that is, each PSCCH sub-channel is defined by a set of PSCCH candidates, the second set of PSCCH candidates include at least one PSCCH candidate.

It should be noted that the foregoing first set of PSCCH candidates and the second set of PSCCH candidates only mean to distinguish the definition of the resource block, and cannot be understood as the limitation of the set of candidates.

On the basis of the foregoing solution, the embodiment of the present disclosure provides a method for transmitting control information, as shown in FIG. 5, the method includes:

Step S501: determining at least one PSCCH candidate on the selected at least one PSCCH resource when performing sidelink communication; and Step S502: transmitting the PSCCH on the determined at least one PSCCH candidate.

Further, the method further includes the step of transmitting the PSSCH associated with the PSCCH on the selected at least one PSSCH resource.

In this embodiment, the executor of the method may be a User Equipment (UE).

Briefly, when the UE performs the sidelink communication, at least one PSCCH resource for transmitting the PSCCH and at least one PSSCH resource for transmitting the associated PSSCH are respectively selected, and the PSSCH is transmitted on the selected at least one PSSCH resource, at least one PSCCH candidate for transmitting the PSCCH is further selected on the selected at least one PSCCH resource, and the PSCCH is transmitted on the determined at least one PSCCH candidate.

In this embodiment of the present disclosure, the selected at least one PSSCH resource and the selected at least one PSCCH resource are independent or associated with each other.

Specifically, the PSCCH resource and the PSSCH resource may be independent of each other; or, the PSCCH resource and the PSSCH resource may also be associated with each other. For a case that there is an association between a PSCCH resource and a PSSCH resource, the PSCCH resource and the PSSCH resource associated therewith are used to transmit the PSCCH and the PSSCH associated therewith, respectively.

In a possible embodiment of the present disclosure, the selected at least one PSSCH resource and the selected at least one PSCCH resource are respectively associated with each other, that is, one PSSCH resource may be associated with one PSCCH resource.

In another possible implementation of the present disclosure, the selected at least one PSSCH resource is associated with the selected more than on PSCCH resources, that is, one PSSCH resource may be associated with multiple PSCCH resources, and the time-frequency resource location of the multiple PSCCH resources is frequency-division multiplexing (FDM) and/or time division multiplexing (TDM), and different PSCCH resources do not overlap with each other, or different PSCCH resources fully or partially overlap with each other.

Optionally, the association between the PSSCH resource and the PSCCH resource may be predefined. As an example, if a V2X sub-channel includes multiple PSCCH resources and one PSSCH resource, the one PSSCH resource is associated with the multiple PSCCH resources. In another example, if one V2X sub-channel includes multiple PSCCH sub-channels and one PSSCH sub-channel, the one PSSCH sub-channel is associated with the multiple PSCCH sub-channels.

Optionally, the PSCCH and PSSCH resources that use the time domain resources and/or the frequency domain resources meeting predetermined conditions (e.g. the same frequency domain resource start location and the same time domain resource) are associated with each other.

Optionally, the association between the PSSCH resource and the PSCCH resource may also be dynamically indicated. In a possible implementation manner, a PSSCH resource (PSSCH resource location) associated with one PSCCH resource is indicated in the SCI transmitted in the PSCCH resource.

In the embodiment of the present disclosure, if the resource pool allows the PSSCH to be transmitted on the PSCCH resource, the method further includes: transmitting the PSSCH associated with the PSCCH on the PSCCH candidate other than the determined at least one PSCCH candidate, that is, the PSSCH resource selected by the UE for transmitting the PSSCH associated with the PSCCH may further include all or part of resources of one or more PSCCH sub-channels. FIG. 6 provides an example of transmitting a PSSCH on a PSCCH resource, where FIG. 6 includes two V2X sub-channels, each of which includes one PSSCH sub-channel and one PSCCH sub-channel, respectively, and the PSCCH sub-channel of upper V2X sub-channel in FIG. 6 is used for PSCCH transmission, the PSSCH sub-channel of the upper V2X sub-channel and the PSCCH sub-channel (shown by the area enclosed by the dotted line in the figure) and the PSSCH sub-channel of the lower V2X sub-channel are all used for PSSCH transmission.

It can be seen from the above that among the PSCCH resources determined by the UE for transmitting the PSCCH, each PSCCH resource may be composed of one or more PSCCH sub-channels. In this embodiment of the present disclosure, a possible PSCCH candidate division manner is provided:

(1) if each PSCCH resource is composed of one PSCCH sub-channel, the second set of PSCCH candidates corresponding to one PSCCH sub-channel includes at least two PSCCH candidates.

As an example, if a V2X sub-channel as shown in FIG. 7a includes one PSCCH sub-channel and one PSSCH sub-channel, the PSCCH sub-channel may be a second set of PSCCH candidates, including two PSCCH candidates, that is, a PSSCH sub-channel may be composed of two PSCCH candidates. In practical applications, the two PSCCH candidates in FIG. 7a may be FDM. Similarly, when a PSCCH sub-channel is composed of multiple PSCCH candidates, the multiple PSCCH candidates may be FDM, TDM, or FDM and TDM.

(2) if each PSCCH resource is composed of at least two PSCCH sub-channels, the second set of PSCCH candidates corresponding to each PSCCH sub-channel may include a PSCCH candidate.

As an example, if a V2X sub-channel as shown in FIG. 7b includes two PSCCH sub-channels and one PSSCH sub-channel, each PSCCH sub-channel may be a second set of PSCCH candidates, and each second set of PSCCH candidates includes one PSCCH candidate, that is, each PSSCH sub-channel may be composed of one PSCCH candidate. In practical applications, the two PSCCH candidates in FIG. 7b may be FDM. Similarly, when multiple PSCCH sub-channels are included in one PSCCH resource, the corresponding multiple PSCCH candidates may be FDM, TDM, or FDM and TDM.

(3) if each PSCCH resource includes at least two PSCCH sub-channels, the second set of PSCCH candidates corresponding to each PSCCH sub-channel includes at least two PSCCH candidates.

As an example, if a PSCCH resource includes two PSCCH sub-channels and one PSSCH sub-channel, each PSCCH sub-channel may be a second set of PSCCH candidates, and each second set of PSCCH candidates includes two PSCCH candidates, that is, each PSCCH sub-channel may be composed of two PSCCH candidates. In practical applications, four PSCCH candidates may be FDM. Similarly, when multiple PSCCH sub-channels are included in one PSCCH resource, the corresponding multiple PSCCH candidates may be FDM, TDM, or FDM and TDM.

(4) if each PSCCH resource includes one PSCCH sub-channel, the second set of PSCCH candidates corresponding to each PSCCH sub-channel includes one PSCCH candidate;

In the solution, when the UE selects at least two PSCCH resources for transmission, at least two PSCCH resources correspond to at least two PSCCH candidates, and the UE may determine at least one PSCCH candidate for transmission in at least two PSCCH candidates.

In the embodiment of the present disclosure, for a case that the foregoing one PSCCH resource is one PSCCH sub-channel, or one PSCCH resource is composed of multiple PSCCH sub-channels, when the size of one PSCCH sub-channel is M resource blocks (RBs) in the frequency domain and L symbols in the time domain, if the time-frequency sizes of each of PSCCH candidates are equal, there are three cases: if each PSCCH candidate is FDM, the size of each PSCCH candidate is M/X RBs in the frequency domain and L symbols in the time domain; or, if each of PSCCH candidates is TDM, the size of each PSCCH candidate is M RBs in the frequency domain and L/X symbols in the time domain; or, if each of PSCCH candidates is FDM and TDM, and the size of each PSCCH candidate is M/X*k RBs in the frequency domain and L/k symbols in the time domain, where X represents the number of PSCCH candidates included in one PSCCH sub-channel (that is, a PSCCH sub-channel is composed of X PSCCH candidates with the same resource size and non-overlapped time-frequency resources), and k represents the number of PSCCH candidates being frequency-division multiplexing (FDM) on the same time-domain resource in one PSCCH sub-channel. Otherwise, if all of time-frequency sizes of the PSCCH candidates are not equal, one possible case is that there are X1*X2 PSCCH candidates of which sizes are M/X1 RBs in the frequency domain and L/X2 symbols in the time domain (for the sake of description, referred to as the minimum PSCCH candidate), the size of the remaining PSCCH candidates is an integer multiple of the minimum PSCCH candidate. For example, there are X1*X2/Y1/Y2 PSCCH candidates of which sizes are M/X1*Y1 RBs in the frequency domain and L/X2*Y2 symbols in the time domain. The size of the largest PSCCH candidate is the size of the corresponding PSCCH sub-channel, that is, M RBs in the frequency domain and L symbols in the time domain. The time-frequency resource locations of the above PSCCH candidates may be (partially) overlapped or non-overlapped. For example, resource locations of PSCCH candidates having the same size do not overlap, and resource locations of PSCCH candidates having different sizes may be overlapped. This case is similar to different aggregation levels of the PDCCH candidate design of PDCCH/MPDCCH/NPDCCH in LTE.

In the embodiment of the present disclosure, it illustrates an example that a PSCCH resource is used as a V2X sub-channel. Specifically, when the UE performs sidelink communication, the UE selects at least one V2X sub-channel, or determines all or part of the PSCCH sub-channel in at least one V2X sub-channel, or determines at least one specific PSCCH sub-channel for sidelink transmission, and determines at least one of the PSCCH candidates for transmitting the PSCCH.

In a specific example, it is selected that all PSCCH sub-channels in one V2X sub-channel for transmission is one PSCCH sub-channel, and one PSCCH sub-channel is composed of A PSCCH candidates, and the UE further determines that $A_0$ PSCCH candidates are used to transmit the PSCCH.

In another specific example, it is selected that all PSCCH sub-channels in one V2X sub-channel for transmission are B PSCCH sub-channels, and each PSCCH sub-channel is one PSCCH candidate, and the UE further determines that $B_0$ PSCCH candidates are used to transmit the PSCCH.

In another specific example, it is selected that all PSCCH sub-channels in one V2X sub-channel for transmission are C PSCCH sub-channels, and each PSCCH sub-channel is composed of D PSCCH candidates, and the UE further determines $E_0$ PSCCH candidates among E=C*D candidates are used to transmit the PSCCH.

Where, A, $A_0$, B, $B_0$, C, D, E and $E_0$ are positive integers.

In general, the UE determines that H PSCCH candidates in the G PSCCH sub-channels among the F V2X sub-channels for transmitting the PSCCH. When F=G=H=1, the UE determines that one PSCCH candidate is used for transmitting the PSCCH; otherwise, the UE determines that multiple PSCCH candidates are used for transmitting the PSCCH, and the multiple PSCCH candidates may be continuous or discontinuous in the time domain and/or the frequency domain.

For a case that the UE determines that multiple PSCCH candidates are used for transmitting the PSCCH, in a possible implementation manner, the UE transmits one complete PSCCH on each PSCCH candidate, and the transmission on multiple PSCCHs is referred to as a repetition of the PSCCH. Multiple repetitions of the PSCCH may be included in one sidelink transmission.

In the implementation of the present disclosure, it illustrates that one PSCCH resource is at least one CCE. Specifically:

In a specific example, one PSCCH resource is one CCE, and the CCE includes $I_1$ REGs. One PSCCH resource includes $J_1$ PSCCH candidates, and each PSCCH candidate includes $I_1/J_1$ REGs.

In another specific example, one PSCCH resource is R CCEs, and each CCE includes $I_2$ REGs. One PSCCH resource includes $J_2$ PSCCH candidates, and each PSCCH candidate includes $R*I_2/J_2$ REGs.

For the above two examples, the CCEs or REGs included in each PSCCH candidate may be continuous or discontinuous in the time domain and/or frequency domain. For example, different PSCCH candidates are mapped by using an interleaved manner.

As an example, as shown in FIG. 8, one PSCCH resource is one CCE including 6 REGs ($REG_0$~$REG_5$), and each REG includes 12 REs. The REGs are mapped in the CCE in the order of first the time domain then the time domain. In a case that all of the time-frequency sizes of the PSCCH candidates are equal, the PSCCH resource includes 6 PSCCH candidates, and each REG is one PSCCH candidate; or, the PSCCH resource includes 3 PSCCH candidates, respectively consisting of $REG_0$ and $REG_3$, $REG_1$ and $REG_4$, $REG_2$ and $REG_5$; or, the one PSCCH resource include one PSCCH candidate, and the PSCCH candidate is composed of all six REGs. Otherwise, in a case that all of the time-frequency sizes of the PSCCH candidates are not equal, the one PSCCH resource includes six PSCCH candidates consisting of one REG, three PSCCH candidates consisting of two REGs (respectively consisting of $REG_0$ and $REG_3$, $REG_1$ and $REG_4$, $REG_2$ and $REG_5$, and a PSCCH candidate consisting of all six REGs.

In the embodiment of the present disclosure, a possible implementation manner is provided for step S501. Specifically, In a possible implementation manner, the UE further determines at least one PSCCH candidate for transmitting the PSCCH, including randomly selecting at least one PSCCH candidate for transmitting the PSCCH.

In another possible implementation manner, the UE determines at least one PSCCH candidate on the selected at least one PSCCH resource based on at least one of the following: UE identification, radio network temporary identity (RNTI), reference signal configuration, sidelink transmission being first transmission or $N^{th}$ retransmission, redundancy version (RV), geographic location information, channel detection result, scheduling information sent by the base station, scheduling information sent by other UEs, where N is a natural number.

Where, the reference signal configuration includes at least one of the following: a demodulation reference signal (DMRS) antenna port, a DMRS pattern, DMRS scrambling information, DMRS cyclic shift, CSI-RS configuration information, PT-RS configuration information, and configuration information of other reference signals dedicated to sidelink channel measurement.

In practical applications, the reference signal configuration is a reference signal configuration used by the PSCCH and/or the PSSCH.

Where, the UE identification includes an identification of the UE that sends the PSCCH and an identification of the destination UE of the PSCCH.

Where, the scheduling information sent by the other UEs includes scheduling information that explicitly indicates the sidelink transmission resource, such as a sidelink grant message, and further includes additional information that assists the base station to perform sidelink resource scheduling or assists the UE to select the sidelink resource.

In a specific example, the UE determines at least one PSCCH candidate for transmitting the PSCCH based that the sidelink transmission is the first transmission or the $N^{th}$ retransmission. Specifically, it may include deriving at least one PSCCH candidate based that the sidelink transmission is the $N^{th}$ retransmission, and the resource location used by at least one transmission of the first transmission and the first N−1 retransmissions of the $N^{th}$ retransmitted data. Or, the transmitted PSCCH sub-channel may also be determined directly according to the $N^{th}$ retransmission. As an example, the sidelink transmission of the UE uses Q V2X sub-channels, wherein the SCI uses the PSCCH sub-channel in one of the Q V2X sub-channels for transmission. In a specific example, the UE determines to use the PSCCH sub-channel in the first V2X sub-channel in the Q V2X sub-channels for transmission based that the sidelink transmission is the first transmission (also referred to as the $0^{th}$ transmission or the $0^{th}$ retransmission); or, the UE determines to use PSCCH sub-channel in the $(N+1)^{th}$ (or the N+1 mod M, mod represents a modulo operation) V2X sub-channel in the M V2X sub-channels for transmission based that the sidelink transmission is the $N^{th}$ retransmission (if the first transmission is the $0^{th}$ transmission, the $N^{th}$ retransmission may also be referred to as the $N^{th}$ transmission; or if the first transmission is the first transmission, the $N^{th}$ retransmission may also be referred to as $(N+1)^{th}$ transmission).

In another specific example, the UE determines at least one PSCCH candidate on the selected one of the PSCCH resources according to the DMRS antenna port. Specifically, according to the DMRS antenna port S, the $Y_0^{th}$ of the Y PSCCH candidates in the selected one PSCCH sub-channel is used as the determined PSCCH candidate, wherein the mapping relationship between $Y_0$ and S is predefined. As an example, $Y_0$=S mod Y, mod represents a modulo operation, and $Y_0$ is derived based on S according to the mapping relationship. In the practical application, other mapping relationships may also be used, which are not limited in this embodiment of the present disclosure. Similarly, the UE may also derive and determine at least one PSCCH candidate for transmitting the PSCCH based on other information in the reference signal configuration according to the pre-defined mapping relationship In another specific example, the UE determines at least one PSCCH candidate for transmitting the PSCCH in at least one of the following manners:

calculating an index or a sequence number of a PSCCH candidate for transmitting a PSCCH according to a pre-defined formula based on a UE identification and/or an RNTI and/or an RV version;

The UE derives an index or a sequence number of the PSCCH candidate for transmitting the PSCCH according to the pre-defined mapping relationship based on the geographic location information of the UE and/or the receiving terminal;

The UE selects a PSCCH candidate with better channel quality according to the channel detection result;

The UE uses the PSCCH candidate indicated in the scheduling information according to the scheduling information sent by the base station and/or other UEs, or selects a PSCCH candidate with a better channel quality according to the scheduling information.

When the Y PSCCH candidates in the selected one PSCCH sub-channel are FDM, the following frequency domain resources of the selected one PSCCH sub-channel may be used when transmitting the PSCCH on the determined $Y_0^{th}$ PSCCH candidate:

$$RB\#m+(Y_0-1)*P \sim RB\#m+Y_0*P-1$$

Wherein the frequency domain granularity of each PSCCH candidate is P RBs, and RB#m is the starting RB of the one PSCCH sub-channel, and $RB\#m+(Y_0-1)*P \sim RB\#m+Y_0*P-1$ represents that the range of frequency domain resources used is $RB\#m+(Y_0-1)*P$ to $RB\#m+Y_0*P-1$.

In the embodiment of the present disclosure, after the UE further determines, in step S501, the at least one PSCCH candidate for transmitting the PSCCH, and while transmits the PSCCH on the determined at least one PSCCH candidate in step S502, the method further includes that the UE does not perform transmission on PSCCH candidates other than the determined at least one PSCCH candidate.

As shown in FIG. 9a, the PSCCH resource in the sidelink transmission resource determined by the UE is composed of 2 PSCCH candidates, and the UE transmits the PSCCH on the determined one PSCCH candidate, and does not transmit the PSCCH on the other PSCCH candidate (the PSCCH shown in the dotted line in the figure).

Or, in the embodiment of the present disclosure, after the UE further determines, in step S501, the at least one PSCCH candidate for transmitting the PSCCH, and while transmits the PSCCH on the determined at least one PSCCH candidate in step S502, the method further includes: transmitting the PSSCH associated with the PSCCH on the PSCCH candidates other than the determined at least one PSCCH candidate.

As shown in FIG. 9b, the PSCCH resource in the sidelink transmission resource determined by the UE is composed of two PSCCH candidates, and the UE transmits the PSCCH on the determined one PSCCH candidate and transmits the PSSCH on the other PSCCH candidate.

FIG. 9a and FIG. 9b provide examples of not transmitting or transmitting a PSSCH on the remaining PSCCH candidates in one V2X sub-channel. Similarly, when the UE uses multiple V2X sub-channels for sidelink transmission, the remaining PSCCH candidates that are not used to transmit the PSCCH in multiple V2X sub-channels may also not transmit or transmit the PSSCH.

In this embodiment, after the UE further determines, in step S501, the at least one PSCCH candidate for transmitting the PSCCH, and while transmits the PSCCH on the determined at least one PSCCH candidate in step S502, and further includes: transmitting the DMRS corresponding to the PSSCH on the determined PSSCH resource.

Specifically, the UE transmits the DMRS corresponding to the PSCCH by at least one of the following transmission ways: 1. transmitting on the determined at least one PSCCH candidate; 2. transmitting on all of the PSCCH candidates in the PSCCH sub-channel corresponding to the determined at least one PSCCH candidate; 3. transmitting on all of the PSCCH candidates in the at least one PSCCH resource corresponding to the determined at least one PSCCH candidate; and 4. transmitting on all of the PSCCH candidates in the selected at least one PSCCH resource.

In a specific example, the UE determines a PSCCH candidate for transmitting a PSCCH according to at least a DMRS antenna port number in a reference signal configuration, and transmits a DMRS using the antenna port number on the determined PSCCH candidate. In addition, the UE may also transmit DMRSs using the antenna port number on other PSCCH candidates that are not used to transmit the PSCCH.

In another specific example, the UE determines a PSCCH candidate for transmitting a PSCCH according to at least a DMRS pattern in a reference signal configuration, and transmits a DMRS using the pattern on the determined PSCCH candidate. In addition, the UE may also transmit DMRS using the pattern on other PSCCH candidates that are not used to transmit the PSCCH.

That is, when at least one PSCCH candidate is determined on the selected at least one PSCCH resource according to the DMRS antenna port and/or the DMRS pattern, transmitting the DMRS corresponding to the PSCCH includes transmitting DMRS corresponding to the DMRS antenna port and/or the DMRS pattern.

In this embodiment of the present disclosure, the UE transmits a PSSCH on the selected at least one PSSCH resource, further determines at least one PSCCH candidate for transmitting the PSCCH on the selected at least one PSCCH resource, and transmits the PSCCH on the determined at least one PSCCH candidate. The method further includes transmitting, by the UE, a DMRS corresponding to the PSCCH on the corresponding PSSCH resource. In a specific example, the UE determines a PSCCH candidate for transmitting a PSCCH according to a DMRS antenna port number and/or a DMRS pattern in a reference signal configuration, and transmits DMRS using the antenna port number and/or the DMRS pattern on a corresponding PSSCH resource. The effect of this design is that when the UEs using different antenna ports or DMRS patterns select the same PSSCH resource for transmission, that is, when conflict occurs, it may employ decoding technology similar to multi-user multi-input and multi-output (MU-MIMO) technology, to respectively solve the data transmitted by each UE.

The method for transmitting control information provided by the embodiment of the present disclosure can fully utilize the control channel resources for transmitting the SCI in the V2X resource pool, so that when the same data resource is used for the sidelink transmission of different UEs, the degree of conflict of control messages between the UEs is reduced, and the negative impact of conflicts caused by different UE on performance is effectively improved, thereby improving the decoding performance of the sidelink control information.

Furthermore, in the LTE system sidelink communication design, each UE needs to monitor all PSCCH resources and blindly detect the sidelink control information SCI thereon. The types of sidelink communication in the NR V2X system include unicast and groupcast. The information that the SCI needs to carry may be more complicated than that of LTE. Therefore, it is difficult to use a unified SCI design in the system. If more than one SCI format is introduced, the cost of the UE blindly detecting the SCI is increased. Therefore, in a possible prior art, the sidelink control information SCI is split, so that the SCI of one sidelink transmission is carried in two SCI messages. Each UE only needs to blindly detect the first SCI message and determine whether it is the target UE or the destination UE (also referred to as the target UE) of the SCI message, and if so, continue to decode the associated second SCI messages and a PSSCH associated with the SCI, otherwise the associated second SCI message and the PSSCH associated with the SCI are not decoded. The method can only retain the information used to determine whether decoding the second SCI/PSSCH and the information necessary for decoding in the first SCI, thereby simplifying the content carried in the first SCI, and avoiding introducing more than one SCI format in the first SCI, thereby reducing the cost of the UE blindly detecting the first SCI, and by the step of determining the target UE, makes the UE reduce the unnecessary cost of decoding the second SCI and PSSCH. This prior art is also known as 2-stage SCI.

In the 2-stage SCI, the first SCI and the second SCI do not necessarily have a sequential relationship. For example, the first SCI and the second SCI may be frequency division multiplexing (FDM). When an SCI message describing to use the 2-phase SCI feature is the first SCI or the second SCI, it is distinguished based on its function, rather than based on the time at which the SCI message is transmitted. For example, the SCI that makes each UE to perform receiving and blindly detecting and carries the identification information of the target UE is the first SCI; and the SCI that only makes the target UE to perform receiving and carries more information of the PSSCH is the second SCI.

In the sidelink transmission using the 2-stage SCI, the PSSCH associated with the given 2-stage SCI is associated with both the first SCI message and the second SCI message, that is, the first SCI and the second of the 2-stage SCI are associated with the same PSSCH.

Currently, for the sidelink transmission using the 2-stage SCI, there is still lack of specification for transmitting the control information, and it requires corresponding design.

Based on that, the embodiment of the present disclosure further provides a method for transmitting information, as shown in FIG. 10, the method includes:

Step S1001: determining resources for transmitting first sidelink control information (SCI) and second SCI, the first SCI and the second SCI being associated to the same physical sidelink shared channel (PSSCH); and Step S1002: transmitting the first SCI and the second SCI on the determined resources.

Specifically, step S1001 can be implemented by any of the following manners:

(1) determining that the resource for transmitting the first SCI is a physical sidelink control channel (PSCCH) resource, and the resource for transmitting the second SCI is a PSSCH resource.

In this solution, the first SCI is transmitted on the selected PSCCH resource, and the second SCI and the PSSCH associated with the second SCI are transmitted on the selected PSSCH resource.

When the determining that the resource for transmitting the second SCI is the PSSCH resource, the transmitting the second SCI on the determined resource (that is, transmitting the second SCI and the PSSCH associated with the second SCI on the selected PSSCH resource) includes any one of the following:

1. mapping respectively the second SCI and the PSSCH associated with the second SCI onto the determined PSSCH resources and using non-overlapped resource locations, and transmitting the second SCI and the PSSCH associated with the second SCI on the determined PSSCH resources.

Specifically, the second SCI and the PSSCH associated with the second SCI are respectively mapped onto the selected PSSCH resources, and the resource locations that do not overlap with each other are used. FIGS. 11a-11d are four specific examples of mapping the second SCI and the PSSCH associated with the second SCI onto the selected PSSCH resources, respectively. Taking FIG. 11a as an example, the UE maps the second SCI onto the determined PSSCH resources according to the order of first the frequency domain then the time domain, and rate matches the PSSCH associated with the second SCI to other PSSCCH resources among the determined PSSCCH resources that are not used to transmit the second SCI. Wherein, the remaining PSSCH resources are the remaining PSSCH resources among the selected PSSCH resources other than the PSSCH resources that map onto the second SCI. According to different PSCCH and PSSCH multiplexing modes and different SCI sizes, the resource location for mapping the second SCI and the resource location of the first SCI are completely or partially TDM and/or FDM, and FIGS. 11a-11d provide corresponding different examples. Similarly, the UE may also map the second SCI onto the selected PSSCH resource according to the order of first the time domain then the frequency domain or according to a predetermined pattern, and map PSSCH associated with the second SCI onto the remaining PSSCH resources.

2. Mapping the second SCI onto the PSSCH resource carrying the PSSCH associated with the second SCI, and transmitting the second SCI on the PSSCH resource carrying the PSSCH associated with the second SCI, wherein the resource that corresponds to the resource location of the second SCI on the PSSCH resource carrying the PSSCH associated with the second SCI is punctured.

Specifically, the second SCI is carried on the PSSCH resource carrying the PSSCH associated with the second SCI. FIG. 12 is a specific example of second SCI being carried on the PSSCH resource carrying the PSSCH associated with the second SCI. As shown in FIG. 12, the PSSCH associated with the second SCI is mapped onto the PSSCH resource, and the second SCI may be mapped onto a predefined resource element (RE), a resource element group (REG) or a symbol. Wherein, the predefined resource element (RE), the resource element group (REG) or the symbol may be the resource element (RE) or the resource element group (REG) or symbol closest to the reference signal (RS), and thereby to guarantee the decoding performance. Further, the PSSCH associated with the second SCI is punctured by the second SCI, for example, the resource that corresponds to the resource location of the second SCI on the PSSCH resource carrying the PSSCH associated with the second SCI is punctured. It should be noted that, since the frame structure of NR V2X has not been determined in the prior art, FIG. 12 is only an illustrative example for explaining how to carry the second SCI on the PSSCH resource, and is not limited to the specific number of symbols, SCI/PSCCH time-frequency resource size, reference signal location, PSCCH/PSSCH multiplexing mode, etc.

In an exemplary embodiment, the PSCCH resource selected in the foregoing includes at least one PSCCH resource, each PSCCH resource includes a technical solution of at least one PSCCH candidate, and the second SCI is carried on the PSSCH carrying the data and has several possible mapping patterns. When the first SCI uses the $W^{th}$ PSCCH candidate in one PSCCH sub-channel, the second SCI uses the $W^{th}$ pattern in several possible mapping patterns.

(2) determining that the resource for transmitting the first SCI and the second SCI are PSCCH resources.

In this solution, the first SCI and the second SCI are transmitted on the selected PSCCH resource, and non-overlapped resource locations are used, the PSSCHs associated with the second SCI are transmitted on the selected PSSCH resources.

Wherein when determining that the resource for transmitting the first SCI and the second SCI are PSCCH resources, the transmitting the first SCI and the second SCI on the determined resource includes any one of the following: that is, the first SCI and the second SCI are transmitted on the selected PSCCH resource, and non-overlapped resource locations are used, includes any one of the following:

1. Mapping respectively the first SCI and the second SCI onto the determined PSCCH resources and using non-overlapped resource locations, and transmitting the first SCI and the second SCI on the determined PSCCH resources.

In an exemplary embodiment, the PSCCH resource selected in the foregoing includes at least one PSCCH resource, and each PSCCH resource includes a technical solution of at least one PSCCH candidate, and the first SCI may be transmitted on the at least one PSCCH candidate among the determined PSCCH resources; the second SCI may be transmitted on other PSCCH resources that are not used to transmit the first SCI among the determined PSCCH resources. Specifically, the second SCI is transmitted on at least one of the other PSCCH candidates that are not used to transmit the first SCI among the determined PSCCH resources.

In another exemplary embodiment, the second SCI has multiple candidate resource locations available for transmission, and the UE determines at least one candidate resource location to transmit the second SCI, the PSCCH resource for transmitting the first SCI and the PSCCH resources for transmitting the second SCI are independent or associated with each other. For the associated case, the UE derives a resource for transmitting the second SCI according to the resource used for transmitting the first SCI. For example, when the first SCI uses the $T_1^{th}$ PSCCH candidate resource location in one PSCCH sub-channel, the second SCI uses the $T_1^{th}$ candidate resource locations among all candidate resource locations. For another example, when the first SCI uses the $T_2^{th}$ PSCCH candidate resource location in one PSCCH sub-channel, the candidate resource location used by the second SCI is the $(T_2+M_1 \sim T_2+M_2)^{th}$ PSCCH candidate in the PSCCH sub-channel.

In still another exemplary embodiment, the resource location for transmitting the second SCI is fixed or independent of the resource location used for transmitting the first SCI.

2. Mapping the second SCI onto the PSCCH resource carrying the first SCI, and transmitting the second SCI on the PSCCH resource carrying the first SCI, wherein the resource that corresponds to the resource location of the second SCI on the PSSCH resource carrying the first SCI is punctured;

3. Mapping the first SCI onto the PSCCH resource carrying the second SCI, and transmitting the first SCI on the PSCCH resource carrying the second SCI, wherein the resource that corresponds to the resource location of the first SCI on the PSSCH resource carrying the second SCI is punctured.

Similarly, the carrying manner may be referred to the above description, and will not be repeated here.

(3) determining that the resource for transmitting the first SCI is a PSCCH resource, and the resource for transmitting the second SCI is a separate channel.

In this solution, the first SCI is transmitted on a selected PSCCH resource, the second SCI is transmitted on a separate channel, and the PSSCH associated with the second SCI is transmitted on the selected PSSCH resource.

Wherein, the separate channel refers to a channel that is different from the PSCCH resource and the PSSCH resource and is dedicated to transmitting the second SCI in the sidelink communication using the 2-stage SCI.

In this embodiment of the present disclosure, the resource location of the separate channel for carrying the second SCI and the resource location of the first SCI are TDM and/or FDM;

And/or, the resource location of the separate channel for carrying the second SCI and the resource location of the PSSCH associated with the second SCI are TDM and/or FDM.

In the embodiment of the present application, in the possible implementation manner of step S501, the method of UE further determining at least one PSCCH candidate for transmitting the PSCCH further includes: further determining at least one PSCCH candidate for transmitting the PSCCH, among the PSSCH candidates included in the PSCCH resources corresponding to or associated with the multiple PSSCH sub-channels, when the UE transmitting the sidelink data by using multiple PSSCH sub-channels.

Optionally, the UE determines the number of the PSCCH candidates for transmitting the PSCCH based on at least one of the following: the bits of information of the PSCCH, sizes of the SCI carried by the PSCCH, formats of the SCI carried by the PSCCH, and service priorities of the sidelink data (it may be indicated by QoS that is carried in at least the SCI), a target communication range, types of services (unicast/groupcast/broadcast), and sizes of the PSCCH candidates. Or, the UE uses the higher-layer-configured or preconfigured or predefined number of the PSCCH candidates for transmitting the PSCCH.

Optionally, after the UE determines that the number of PSCCH candidates for transmitting the PSCCH is N, the UE further determines that N PSCCH candidates in M PSCCH sub-channels, among all the PSCCH resources associated with the multiple PSSCH sub-channels, are used for transmitting the PSCCH; specifically, including at least one of the following:

the UE further determines that N PSCCH candidates included in the M PSCCH sub-channels with the lowest frequency domain location (or similarly replaced with the highest frequency domain location), among all the PSCCH resources associated with the multiple PSSCH sub-channels, are used for transmitting the PSCCH;

the UE further determines that N PSCCH candidates with the lowest frequency domain location (or similarly replaced with the highest frequency domain location), among all the PSCCH resources associated with the multiple PSSCH sub-channels, are used for transmitting the PSCCH;

the UE further determines a time domain pattern and/or a frequency domain pattern corresponding to the PSCCH candidate resources for transmitting the PSCCH, among all the PSCCH resources associated with the multiple PSSCH sub-channels, and determines that the PSSCH candidates corresponding to the frequency domain location indicated by the pattern are used for transmitting the PSCCH.

As explained in the possible implementation manner of step S501, for further determining that N PSCCH candidates in M PSCCH sub-channels, among all the PSCCH resources associated with the multiple PSSCH sub-channels, are used for transmitting the PSCCH, the UE may be based on at least one piece of the following information: UE identification, radio network temporary identity (RNTI), reference signal configuration, sidelink transmission being first transmission or $N^{th}$ retransmission, redundancy version, geographic location information, channel detection result, scheduling information sent by the base station, scheduling information sent by other UEs, where N is a natural number.

Wherein, the reference signal configuration includes at least one of the following: a demodulation reference signal (DMRS) antenna port, a DMRS pattern, DMRS scrambling information, DMRS cyclic shift, CSI-RS configuration information, PT-RS configuration information, and configuration information of other reference signals dedicated to sidelink channel measurement.

In a specific example, the UE determines that the number of candidates, among the PSCCH resources associated with each PSSCH sub-channel, for transmitting the PSCCH is K, and further determines that each of the M PSCCH sub-channels with the highest frequency domain location has a maximum of K PSCCH candidates for transmitting the PSCCH, where M is an upper rounding of N/K. When N can be evenly divided by K, a maximum of K PSCCH candidates in each of the M PSCCH sub-channels are used for transmitting the PSCCH. When N cannot be evenly divided by K, a maximum of K PSCCH candidates in each of the M−1 PSCCH sub-channels among the M PSCCH sub-channels are used to transmit the PSCCH; in the remaining one PSCCH sub-channel of the M PSCCH sub-channels, N−K*(M−1) PSCCH candidates are used to transmit the PSCCH. The remaining one PSCCH sub-channel may be determined according to a preset rule, and may be one sub-channel with the lowest frequency domain location of the M sub-channels. In this example, the number of PSCCH candidates included in each PSCCH sub-channel may be greater than K or equal to K.

In another specific example, the UE determines based on the sidelink transmission being a first transmission or the $N^{th}$ retransmission that the time domain pattern and/or the frequency domain pattern corresponding to the PSCCH candidate resources for transmitting the PSCCH is a time domain pattern and/or frequency domain pattern having index N in a set of time domain patterns and/or frequency domain patterns corresponding to the preconfigured PSCCH candidate resources.

Optionally, after the UE determines the PSCCH candidate resources for transmitting the PSCCH, the location of the resources is indicated in the SCI carried by the PSCCH. For example, after the UE further determines that the time domain pattern and/or the frequency domain pattern corresponding to the PSCCH candidate resources for transmitting the PSCCH is a time domain pattern and/or frequency domain pattern having index N in a set of time domain patterns and/or frequency domain patterns corresponding to the preconfigured PSCCH candidate resources, the value of N is indicated in the SCI. For example, after the UE determines that the number of PSCCH candidates for transmitting the PSCCH is M, the value of M is indicated in the SCI.

Advantages of the above method are that: when the UE transmits the sidelink data by using multiple PSSCH sub-channels, if the resources for transmitting the PSSCH are determined according to a predetermined rule (for example, PSSCH candidates with the lowest frequency domain location or candidates in the PSSCH sub-channel), the method has lower complexity; if the PSSCH candidate patterns are determined according to a specific condition, when the different UEs just select the same or partially overlapping PSSCH to transmit data (that is, a scenario of conflicting). the PSCCHs can use different PSCCH candidate patterns, respectively, to avoid overlapping of PSCCH resources, that is, to avoid conflicts of control information, thereby improving the decoding performance of the PSCCH.

In the embodiment of the present application, for determining resources for transmitting first sidelink control information (SCI) and second SCI, the method further includes: when the UE uses multiple PSSCH sub-channels to transmit the sidelink data, the resources for transmitting the first SCI and the second SCI are determined based on the predetermined rule and/or the scheduling information of the second SCI.

As illustrated in the possible implementation manner (1) of step S1001, the UE determines that the resource for transmitting the first SCI is a physical sidelink control channel (PSCCH) resource, and the resource for transmitting the second SCI is a PSSCH resource. In this scenario, the UE determines that the second SCI is transmitted on the PSSCH resources in the N PSSCH sub-channels, including determining the value of N and determining the locations of the N PSSCH sub-channels in the multiple PSSCH sub-channels.

Optionally, the UE may determine the value of N based on at least one of the following: the number of bits and/or sizes of information of the second SCI, the format of the second SCI, and service priorities of the sidelink data (it may be indicated by QoS that is carried in at least the SCI), a target communication range, types of services (unicast/groupcast/broadcast), and sizes of the resources for carrying the second SCI in each PSSCH sub-channel. Or, the UE uses the higher layer configured or pre-configured or predefined value of N.

Optionally, the UE may determine the locations of the N PSSCH sub-channels in the multiple PSSCH sub-channels based on at least one of the following:

determining that the N PSSCH sub-channels are N sub-channels with the lowest frequency domain index among the multiple PSSCH sub-channels (or similarly replaced with the N sub-channels with the highest frequency domain index);

determining a frequency domain pattern corresponding to the N PSSCH sub-channels, and determining that the PSSCH sub-channels corresponding to the frequency domain locations indicated by the patterns in the multiple PSSCH sub-channels are the N PSSCH sub-channels.

In a specific example, the UE transmits the sidelink data by using ten PSSCH sub-channels, the sub-channel indexes of the ten sub-channels are {M0, M0+1, ..., M0+9}, and the UE determines that the second SCI is transmitted on the PSSCH resource in four PSSCH sub-channels, and the frequency domain pattern corresponding to the four PSSCH sub-channels is {1, 1, 0, 0, 0, 1, 1, 0, 0, 0}, then the UE determines that the second SCI is transmitted on the sub-channels {M0, M0+1, M0+5, M0+6}.

Optionally, the UE indicates the value of N and/or the locations of the N PSSCH sub-channels in the multiple PSSCH sub-channels in the first SCI. For the latter, a specific example is that the UE indicates an index of a frequency domain pattern corresponding to the N PSSCH sub-channels in the first SCI. For example, the UE is configured with a set of frequency domain patterns corresponding to the N PSSCH sub-channels, and further determines a frequency domain pattern corresponding to the actually used N PSSCH sub-channels in the set, where the index of the pattern is K; then the UE indicates the value of K in the first SCI. The advantage of indicating the information is that the receiving terminal UE may decode the second SCI without performing blind detection, but may determine on which resources the second SCI should be decoded according to the information indicated in the first SCI.

Optionally, determining by the UE that the second SCI is transmitted on the PSSCH resources in the N PSSCH sub-channels further includes: the UE mapping the second SCI to the PSSCH resources by using any one of the following methods:

the UE rate matches the second SCI to the PSSCH resources for transmitting the second SCI in all the N PSSCH sub-channels;

the UE rate matches the second SCI to the PSSCH resource for transmitting the second SCI in one PSSCH sub-channel, and repeats the mapping of the one PSSCH sub-channel on each of the N PSSCH sub-channels.

the UE rate matches the second SCI to the PSSCH resources for transmitting the second SCI in the M PSSCH sub-channels, and repeats the mapping of the M PSSCH sub-channels on every M sub-channels of the N PSSCH sub-channels.

As illustrated in the possible implementation (2) of step S1001, the UE determines that the resource for transmitting the first SCI and the second SCI is a PSCCH resource. In this scenario, the UE determines that the second SCI is transmitted on the PSCCH resources associated with the N PSSCH sub-channels, including determining the value of N, and determining the locations of the PSCCH resources and/or the locations of the N PSSCH sub-channels in the multiple PSSCH sub-channels.

Optionally, the UE may determine the value of N based on at least one of the following: the bits and/or sizes of information of the second SCI, the format of the second SCI, and service priorities of the sidelink data (it may be indicated by QoS that is carried in at least the SCI), a target communication range, types of services (unicast/groupcast/broadcast), and sizes of the resources for carrying the second SCI in the PSCCH associated with each PSCCH sub-channel. Or, the UE uses the higher-layer-configured or preconfigured or predefined value of N.

Optionally, determining by the UE the locations of the PSCCH resources includes: if among the multiple PSSCH sub-channels, the PSCCH resources associated with K sub-channels with the lowest frequency domain location (or similarly replaced with the highest frequency domain location) are used to transmit the first SCI, the PSCCH resources associated with the $(K+1)^{th}$ to $(K+N)^{th}$ sub-channels with the lowest frequency domain location are used to transmit the second SCI.

Optionally, the UE may determine the locations of the N PSSCH sub-channels in the multiple PSSCH sub-channels based on at least one of the following:

determining that the N PSSCH sub-channels are N sub-channels with the lowest frequency domain index among the multiple PSSCH sub-channels (or similarly replaced with the N sub-channels with the highest frequency domain index);

determining a frequency domain pattern corresponding to the N PSSCH sub-channels, and determining that the PSSCH sub-channels corresponding to the frequency domain locations indicated by the patterns in the multiple PSSCH sub-channels are the N PSSCH sub-channels. The specific example is similar to the example provided in the possible implementation (1) of step S1001.

Optionally, the UE indicates at least one of the following in the first SCI: the value of N, the location of the PSCCH resource for transmitting the second SCI, and the locations of the N PSSCH sub-channels associated with the PSCCH resource for transmitting the second SCI in the multiple PSSCH sub-channels for transmitting sidelink data. The specific example and advantages are similar to the example and advantages provided in the possible implementation (1) of step S1001.

Optionally, determining by the UE that the second SCI is transmitted on the PSSCH resource associated with the N PSSCH sub-channels, further includes: the UE mapping the second SCI to the PSSCH resources by using any one of the following methods (optionally, the PSCCH resources may be replaced with the PSCCH resource for transmitting the second SCI in the following method):

the UE rate matches the second SCI to the PSSCH resources associated with all the N PSSCH sub-channels;

the UE rate matches the second SCI to the PSCCH resource associated with one PSSCH sub-channel, and repeats the mapping of the PSCCH resource associated with the one PSSCH sub-channel on each of the N PSSCH sub-channels.

the UE rate matches the second SCI rate to the PSCCH resources associated with the M PSSCH sub-channels, and repeats the mapping of the PSCCH resource associated with the M PSSCH sub-channels on every M sub-channels of the N PSSCH sub-channels In the foregoing multiple methods, when the UE transmits the PSSCH and uses multiple scheduling units in the V2X in the frequency domain (in the prior art, the frequency domain scheduling unit is a PSSCH sub-channel), it may be used to determine the PSCCH associated with the PSSCH and/or a frequency domain transmission resource of the second SCI and map the second SCI to the frequency domain transmission resource. Similarly, when the UE transmits the PSSCH and uses multiple scheduling units in the V2X in the time domain (for example, using slot aggregation technology), it can replace the frequency domain scheduling unit, (such as a PSSCH sub-channel) with a time domain scheduling unit (such as, a time slot) in the above described methods, and it may correspondingly determine the PSCCH associated with the PSSCH and/or a time domain transmission resource of the second SCI and map the second SCI to the time domain transmission resource.

The common advantages of the foregoing multiple methods are that: when the UE transmits the sidelink data by using multiple PSSCH sub-channels, if the resources for transmitting the second SCI are determined according to a predetermined rule (for example, the N PSSCH sub-channels or the PSCCH resources/candidates with the lowest frequency domain location), the methods have lower complexity; if the PSSCH candidate patterns are determined according to a specific condition, when the different UEs just select the same or partially overlapping PSSCH to transmit data (that is, a scenario of conflicting). the PSCCHs can use different PSCCH candidate patterns, respectively, to avoid overlapping of PSCCH resources, that is, to avoid conflicts of control information, thereby improving the decoding performance of the PSCCH.

In this embodiment, the time domain resource location, the frequency domain resource location, the time domain resource size, and the frequency domain resource size of each PSCCH resource used for transmitting the SCI in the resource pool may be at least one of the following: predefined; configured by a base station, including derived according to the predefined criteria and the resource pool configuration information; dynamically indicated by the base station, including derived according to the predefined criteria and the information dynamically indicated by of the base station.

In a specific example, at least one of the time domain resource location, the frequency domain resource location, the time domain resource size, and the frequency domain resource size of each PSCCH resource for transmitting the SCI in the resource pool is configured by a base station or a higher layer. Specifically, it can be a portion of resource pool configuration, or is independent of the resource pool configuration.

In another specific example, at least one of the time domain resource location, the frequency domain resource location, the time domain resource size, and the frequency domain resource size of each PSCCH resource for transmitting the SCI in the resource pool is derived according to a V2X sub-channel configuration, wherein the V2X sub-channel configuration further includes a PSCCH sub-channel configuration and/or a PSSCH sub-channel configuration.

In still another specific example, a terminal uses a time domain resource location, a frequency domain resource location, a time domain resource size, and/or a frequency domain resource size of each PSCCH resource in the predefined resource pool before obtaining the base station configuration information or the dynamic indication information, and uses the time domain resource size and the frequency domain resource size configured/indicated by the base station, and continues to use predefined time domain resource locations and frequency domain resource locations after obtaining the time domain resource size and the frequency domain resource size of each PSCCH resource carried in the base station configuration information or the dynamic indication information.

Wherein when more than one SCI are used for sidelink transmission, the SCI may be the first SCI and/or the second SCI. The PSCCH resources for transmitting the first SCI and/or the second SCI are defined by one set of PSCCH candidates, the set of PSCCH candidates may include one PSCCH candidate or include multiple PSCCH candidates. The PSCCH set may be composed of at least one PSCCH sub-channel. Similarly, the PSCCH sub-channel may be a PSCCH sub-channel for transmitting the first SCI and/or the second SCI, which is defined by another set of PSCCH candidates, the another set of PSCCH candidates include one PSCCH candidate or multiple PSCCH candidates.

In a specific example, when the V2X sub-channel configuration includes a PSCCH sub-channel with a frequency domain size of M RBs and there are N PSCCH candidates in the PSCCH sub-channel, the PSCCH candidate has a frequency domain size of M/N, and a time domain size being equal to that of the PSCCH sub-channel. In another specific example, when the V2X sub-channel configuration includes a PSSCH sub-channel with a frequency domain size of M RBs and there are N PSCCH candidates in the V2X sub-channel, the PSCCH candidate has a frequency domain size of M/N, and a time domain size being equal to that of the PSCCH sub-channel.

The above embodiments can be used for a scenario that the sidelink transmission uses a full time slot or a partial of time slot. For the scenario that uses a full time slot, one V2X sub-channel or one V2X transmission has a time domain size of 1 time slot or N full time slots. For the scenario that uses a partial of time slot, one V2X sub-channel or one V2X transmission has a time domain size of x symbols in 1 time slot, or N time slots and each time slot having x available symbols. Wherein, when one V2X sub-channel or o V2X transmission includes the PSSCH and the PSCCH of the TDM, the time domain size of the PSSCH and the PSCCH is determined according to the number of available symbols in the corresponding time slot.

Correspondingly, the embodiment of the present disclosure further provides a method for receiving control information. As shown in FIG. 13, the method includes:

Step S1301: receiving first sidelink control information (SCI) on a physical sidelink control channel (PSCCH) resource.

Step S1302: when the target identification determined based on a decoded first SCI is a specific identification, receiving second SCI on a physical sidelink shared channel (PSSCH) resource or a PSCCH resource or a separate channel, wherein the first SCI and the second SCI are associated with the same PSSCH.

Wherein, the specific identification is at least one identification configured by the high layer, or a pre-configured physical layer identification. In this embodiment of the present disclosure, the specific identification may include the identification of the UE itself, that is, when the current UE determines that the target UE indicated by the SCI includes itself, the second SCI is received on the PSSCH resource or on the PSCCH resource or on a separate channel.

Specifically, in step S1302, the resource for receiving the second SCI may be determined according to the resource of the received first SCI, and the second SCI is received on the determined resource for receiving the second SCI.

For the method for receiving the control information provided by the embodiment of the present disclosure, the implementation principle and the technical effects thereof may be referred to the description in the foregoing embodiments, and are not repeated herein.

It should be noted that the PSCCH in the embodiment of the present disclosure may be a physical downlink control channel (PDCCH), an enhanced PDCCH (EPDCCH), and a machine type communication PDCCH (MPDCCH), a narrowband physical downlink control channel (NPDCCH), NR-PDCCH; the PSSCH may be a physical downlink shared channel (PDSCH), EPDSCH, MPDSCH, NPDSCH, NR-PDSCH.

The time slot in the foregoing embodiments may be a subframe or a time slot corresponding to the resource pool of the sidelink communication, unless otherwise specified. For example, in the V2X system, a resource pool is defined by a repeated bit map mapped onto a particular set of time slots, the set of time slots may be all time slots, or all of the other time slots except for some specific time slots (such as the time slots of transmitting the master information block (MIB)/system information blocks (SIB)). The time slot indicated as "1" in the bitmap may be used for V2X transmission, and belongs to the subframe/time slot corresponding to the V2X resource pool; the time slot indicated as "0" is not available for V2X transmission, and does not belong to the subframe/time slot corresponding to the V2X resource pool. Further, the time slot in each of the above embodiments may be a full time slot, or may be a number of symbols corresponding to the sidelink communication in one time slot. For example, when the sidelink communication is configured to be performed in the $(X_1 \sim X_2)^{th}$ symbols of each time slot, the time slots in the above embodiments are the $(X_1 \sim X_2)^{th}$ symbols in the time slot in this case.

In the above embodiments, the information that is configured by the base station, indicated by the signaling, configured by the higher layer, and pre-configured includes a set of configuration information; or includes multiple sets of configuration information, and the UE selects and uses a set of configuration information from the multiple sets of configuration information according to the predefined conditions; or includes a set of configuration information including multiple subsets, and the UE selects and uses a subset from the multiple subsets according to the predefined conditions.

In the above embodiments, the technology applicable to V2X may also be extended to other sidelink transmission systems. For example, the V2X sub-channel may also be extended to other sidelink transmission systems, such as D2D to become as D2D sub-channels. The V2X resource pool may also be extended to other sidelink transmission systems, such as D2D to become as a D2D resource pool.

In the above embodiments, when the sidelink communication system is a V2X system, the terminal or the UE may be of various types such as a vehicle, an infrastructure, a pedestrian, and the like.

The embodiment of the present disclosure further provides an apparatus for transmitting control information. As shown in FIG. 14, the transmission apparatus 140 may include a determining module 1401 and a transmission module 1402.

The determining module 1401 is configured to determine at least one PSCCH candidate on the selected at least one PSCCH resource when performing sidelink communication.

The transmission module 1402 is configured to transmit the PSCCH on the determined at least one PSCCH candidate.

In an optional implementation, the transmission module 1402 is further configured to transmit a PSSCH associated with the PSCCH on the selected at least one physical sidelink shared channel (PSSCH) resource.

Wherein, the selected at least one PSSCH resource and the selected at least one PSCCH resource are independent or associated with each other.

In an optional implementation manner, the selected at least one PSSCH resource and the selected at least one PSCCH resource being independent or associated with each other, includes: the selected at least one PSSCH resource being associated with more than one selected PSCCH resources.

In an optional implementation manner, the transmission module 1402 is further configured to transmit the PSSCH associated with the PSCCH on PSCCH candidates other than the determined at least one PSCCH candidate.

In an optional implementation manner, the determining module 1401 is specifically configured to determine at least one PSCCH candidate on the selected at least one PSCCH resource based on at least one piece of the following information: UE identification, radio network temporary identity (RNTI), reference signal configuration, sidelink transmission being first transmission or $N^{th}$ retransmission, redundancy version, geographic location information, channel detection result, scheduling information sent by the base station, scheduling information sent by other UEs, where N is a natural number.

In an optional implementation manner, the reference signal configuration includes at least one of the following: a demodulation reference signal (DMRS) antenna port, a DMRS pattern, DMRS scrambling information, DMRS cyclic shift, CSI-RS configuration information, PT-RS configuration information, and configuration information of other reference signals dedicated to sidelink channel measurement.

In an optional implementation manner, the reference signal configuration is a reference signal configuration used by the PSCCH and/or the PSSCH.

In an optional implementation manner, the transmission module 1402 is further configured to transmit a DMRS corresponding to the PSSCH on the determined PSSCH resources.

In an optional implementation manner, the transmission module 1402 is specifically configured to transmit the DMRS corresponding to the PSCCH by at least one of the following ways: transmitting on the determined at least one PSCCH candidate; transmitting on all of the PSCCH candidates in the PSCCH sub-channel corresponding to the determined at least one PSCCH candidate; transmitting on all of the PSCCH candidates in the at least one PSCCH resource corresponding to the determined at least one PSCCH candidate; and transmitting on all of the PSCCH candidates in the selected at least one PSCCH resource.

In an optional implementation manner, each of PSCCH resources comprises at least one of the following: a first set of PSCCH candidates, the first set of PSCCH candidates comprising at least one PSCCH candidate; at least one PSCCH sub-channel; a PSCCH resource using at least one of following predefined or configured items: time domain resource size, frequency domain resource size, time domain resource location, frequency domain resource location; at least one control channel element (CCE); and at least one resource element group (REG).

In an optional implementation manner, when each of PSCCH resources comprises at least one PSCCH sub-channel, each PSCCH sub-channel comprises a second set of PSCCH candidates, the second set of PSCCH candidates comprises at least one PSCCH candidate.

In an optional implementation manner, when the size of one PSCCH sub-channel is M resource blocks (RB) in the frequency domain and L symbols in the time domain, the size of each PSCCH candidate is M/X RBs in the frequency domain and L symbols in the time domain, or the size of each PSCCH candidate is M/X*k RBs in the frequency domain and L/k symbols in the time domain, where X represents the number of PSCCH candidates included in one PSCCH sub-channel, k represents the number of PSCCH candidates for frequency division multiplexing (FDM) on the same time domain resource in one PSCCH sub-channel.

In an optional implementation, the determining module 1401 is specifically configured to: when determining the at least one PSCCH candidate on the selected one PSCCH resource according to the DMRS antenna port, according to the DMRS antenna port S, use the $Y_0^{th}$ of the Y PSCCH candidates in the selected one PSCCH sub-channel as the determined PSCCH candidate, wherein the mapping relationship between $Y_0$ and S is predefined.

In an optional implementation manner, when the Y PSCCH candidates in the selected one PSCCH sub-channel are FDM, the transmission module 1402 is specifically configured to transmit the PSCCH on the determined at least one PSCCH candidate includes: when the PSCCH is transmitted on the determined $Y_0^{th}$ PSCCH candidate, the following frequency domain resources of the selected one PSCCH sub-channel are used:

$$RB\#m+(Y_0-1)*P \sim RB\#m+Y_0*P-1$$

Wherein the frequency domain granularity of each PSCCH candidate is P RBs, and RB#m is the starting RB of the one PSCCH sub-channel, and $RB\#m+(Y_0-1)*P \sim RB\#m+Y_0*P-1$ represents that the range of frequency domain resources used is $RB\#m+(Y_0-1)*P$ to $RB\#m+Y_0*P-1$.

In an optional implementation manner, when determining at least one PSCCH candidate on the selected at least one PSCCH resource according to the DMRS antenna port and/or the DMRS pattern, the transmission module 1402 is specifically configured to transmit DMRS corresponding to the DMRS antenna port and/or DMRS pattern.

It will be apparent to those skilled in the art that for the transmission apparatus provided by the embodiments of the present disclosure, the implementation principle and the technical effects thereof are the same as those of the foregoing method embodiments, for sake of describing and being concise, and what are not mentioned in the embodiment may referred to the description in the foregoing method embodiments, and are not repeated herein.

The embodiment of the present disclosure further provides an apparatus for transmitting control information. As shown in FIG. 15, the transmission apparatus 150 may include a determining module 1501 and a transmission module 1502.

The determining module 1501 is configured to determine resources for transmitting first sidelink control information (SCI) and second SCI, the first SCI and the second SCI being associated to the same physical sidelink shared channel (PSSCH).

The transmission module 1502 is configured to transmit the first SCI and the second SCI on the determined resources.

In an optional implementation manner, the determining module 1501 is specifically configured to any one of the following: determine that the resource for transmitting the first SCI is a PSCCH resource, and the resource for transmitting the second SCI is a PSSCH resource; determine that the resource for transmitting the first SCI and the second SCI is a PSCCH resource; determine that the resource for transmitting the first SCI is a PSCCH resource, and the resource for transmitting the second SCI is a separate channel.

In an optional implementation manner, when determining that the resource for transmitting the second SCI is the PSSCH resource, the transmission module 1502 is specifically configured to any one of the following: map respectively the second SCI and the PSSCH associated with the second SCI onto the determined PSSCH resources and use non-overlapped resource locations, and transmit the second SCI and the PSSCH associated with the second SCI on the determined PSSCH resources; map the second SCI onto the PSSCH resource carrying the PSSCH associated with the second SCI, and transmit the second SCI on the PSSCH resource carrying the PSSCH associated with the second SCI, wherein the resource that corresponds to the resource location of the second SCI on the PSSCH resource carrying the PSSCH associated with the second SCI is punctured.

In an optional implementation manner, the transmission module 1502 is specifically configured to: map the second SCI onto the determined PSSCH resources, and rate match the PSSCH associated with the second SCI to other PSSCH resources among the determined PSSCH resources that are not used to transmit the second SCI based on at least one manner of the following: the order of first the frequency domain then the time domain; the order of first the time domain then the frequency domain; and a predetermined pattern.

In an optional implementation manner, the resource location for mapping the second SCI and the resource location of the first SCI are fully or partially time division multiplexing (TDM) and/or frequency division multiplexing (FDM).

In an optional implementation manner, the transmission module 1502 is specifically configured to map the second SCI onto a predefined resource element (RE), a resource element group (REG) or a symbol.

In an optional implementation manner, when determining that the resource for transmitting the first SCI and the second SCI are PSCCH resources, the transmission module 1502 is specifically configured to any one of the following: map respectively the first SCI and the second SCI onto the determined PSCCH resources and use non-overlapped resource locations, and transmit the first SCI and the second SCI on the determined PSCCH resources; map the second SCI onto the PSCCH resource carrying the first SCI, and transmit the second SCI on the PSCCH resource carrying the first SCI, wherein the resource that corresponds to the resource location of the second SCI on the PSCCH resource carrying the first SCI is punctured; and map the first SCI onto the PSCCH resource carrying the second SCI, and transmit the first SCI on the PSCCH resource carrying the second SCI, wherein the resource that corresponds to the resource location of the first SCI on the PSCCH resource carrying the second SCI is punctured.

In an optional implementation manner, the determined PSCCH resources includes at least one PSCCH resource, each PSCCH resource includes at least one PSCCH candidate, and the transmission module 1502 is specifically configured to transmit the first SCI on at least one PSCCH candidate among the determined PSCCH resources; transmit the second SCI on other PSCCH resources that are not used to transmit the first SCI among the determined PSCCH resources.

In an optional implementation manner, the transmission module 1502 is specifically configured to transmit the second SCI on at least one of the other PSCCH candidates that are not used to transmit the first SCI among the determined PSCCH resources.

In an optional implementation manner, the resource for transmitting the first SCI and the resource for transmitting the second SCI are independent or associated with each other.

In an optional implementation manner, when the resource for transmitting the first SCI and the resource for transmitting the second SCI are associated with each other, the determining module 1501 is specifically configured to derive the resource for transmitting the second SCI based on the resource for transmitting the first SCI.

In an optional implementation manner, the resource location of the separate channel for carrying the second SCI and the resource location of the first SCI are TDM and/or FDM; and/or the resource location of the separate channel for carrying the second SCI and the resource location of the PSSCH associated with the second SCI are TDM and/or FDM.

In an optional implementation manner, at least one of a time domain resource location, a frequency domain resource location, a time domain resource size, and a frequency domain resource size of a PSCCH resource used for transmitting the SCI is configured by a base station or a higher layer; or, at least one of a time domain resource location, a frequency domain resource location, a time domain resource size, and a frequency domain resource size of a PSCCH resource for transmitting an SCI is derived according to a sub-channel configuration, wherein the sub-channel configuration further includes a PSCCH sub-channel configuration and/or PSSCH sub-channel configuration; or, at least one of a time domain resource location, a frequency domain resource location, a time domain resource size, and a frequency domain resource size of a PSCCH resource for transmitting the SCI is predefined.

In an optional implementation manner, at least one of a time domain resource location, a frequency domain resource location, a time domain resource size, and a frequency domain resource size of a PSCCH resource for transmitting the SCI configured by a base station or a higher layer is a portion of resource pool configuration, or is independent of the resource pool configuration.

It will be apparent to those skilled in the art that for the transmission apparatus provided by the embodiments of the present disclosure, the implementation principle and the technical effects thereof are the same as those of the foregoing method embodiments, for sake of describing and being concise, and what are not mentioned in the embodiment may referred to the description in the foregoing method embodiments, and are not repeated herein.

The embodiment of the present disclosure further provides an apparatus for transmitting control information. As shown in FIG. 16, the transmission device 160 may include a first receiving module 1601 and a second receiving module 1602.

The first receiving module 1601 is configured to receive first SCI on a PSCCH resource.

The second receiving module 1602 is configured to: when the target identification determined based on a decoded first SCI is a specific identification, receiving second SCI on a physical sidelink shared channel (PSSCH) resource or a PSCCH resource or a separate channel, wherein the first SCI and the second SCI are associated with the same PSSCH.

In an optional implementation manner, the specific identification is at least one identification configured by the higher layer or a pre-configured physical layer identification.

In an optional implementation, the second receiving module 1602 is specifically configured to determine a resource for receiving the second SCI based on the resource of the received first SCI, and receiving the second SCI on the determined resource for receiving the second SCI.

The embodiment of the present disclosure further provides an electronic device (for example, a terminal device), including: a processor and a memory, where the memory stores at least one instruction, at least one program, a code set or an instruction set, the at least one instruction, the at least one program, the code set or the instruction set is loaded and executed by the processor to implement the corresponding content in the foregoing method embodiments.

Optionally, the electronic device may further include a transceiver. The processor is connected to the transceiver via such as a bus. It should be noted that, in the practical application, the number of transceiver is not limited to one, and the structure of the electronic device does not constitute a limitation to the embodiment of the present disclosure.

Wherein, the processor may be a CPU, a general purpose processor, a DSP, an ASIC, an FPGA or other programmable logic device, a transistor logic device, a hardware component, or any combination thereof. It is possible to implement or execute the various illustrative logical blocks, modules and circuits described in conjunction with the present disclosure. The processor may also be a combination of computing functions, for example, including a combination of one or more microprocessor, a combination of a DSP and a microprocessor, and the like.

The bus may include a path for communicating information between the above components. The bus may be a peripheral component interconnect (PCI) bus or an extended industry standard architecture (EISA) bus. The bus may be divided into an address bus, a data bus, a control bus, and so on. The memory may be a read only memory (ROM) or other type of static storage device that can store static information and instructions, random access memory (RAM) or other types of dynamic storage device that can store information and instructions, also may be electrically erasable programmable read only memory (EEPROM), compact disc read only memory (CD-ROM) or other optical disc storage, optical disc storage (including compression optical discs, laser discs, optical discs, digital versatile discs, Blu-ray discs, etc.), magnetic disk storage media or other magnetic storage devices, or any other medium that can be used to carry or store desired program code in the form of instructions or data structures and can be accessed by a computer, but not limited to this.

The embodiment of the present disclosure further provides a computer readable storage medium for storing computer instructions, which when executed on a computer, enable the computer to execute the corresponding content in the foregoing method embodiments.

It should be understood that although the each of steps in the flowchart of the drawings are sequentially shown as the arrows, these steps are not necessarily performed in the order indicated by the arrows. Unless otherwise expressly stated herein, the implementation of these steps is not strictly limited in the order, and they may be performed in other orders. Moreover, at least some of the steps in the flowchart of the drawings may include multiple sub-steps or stages, and the multiple sub-steps or stages are not necessarily performed at the same time, but may be performed at different times, and the multiple sub-steps or stage are not necessary to be performed sequentially, but may be performed alternately with at least a portion of other steps or sub-steps or stages of other steps.

The above descriptions are only a portion of the embodiments of the present disclosure, and it should be noted that those skilled in the art can make several improvements and modifications without departing from the principles of the present disclosure. These improvements and modifications should be considered to fall with the scope of protection of the present disclosure.

The invention claimed is:

1. A method performed by a first terminal in a communication system, the method comprising:
    identifying resources for a physical sidelink control channel (PSCCH)
    identifying resources for a physical sidelink shared channel (PSSCH);
    transmitting, to a second terminal, first sidelink control information (SCI) on the identified resources for the PSCCH; and
    transmitting, to the second terminal, second SCI and data on the identified resources for the PSSCH,
    wherein the identifying of the resources for the PSSCH comprises:
        mapping the second SCI, according to an order of an index for first frequency domain and then an index for time domain; and
        mapping the data to a resource being not used for the second SCI.

2. The method of claim 1, wherein a number of resources in the frequency domain used for the second SCI is determined according to a number of bits for the second SCI.

3. The method of claim 1, wherein the second SCI is mapped from a resource having a lowest index in the frequency domain.

4. The method of claim 1, wherein the first SCI and the second SCI are associated with the PSSCH.

5. A first terminal in a communication system, the first terminal comprising:
    a transceiver; and
    a processor configured to:
        identify resources for a physical sidelink control channel (PSCCH),
        identify resources for a physical sidelink shared channel (PSSCH),
        transmit, to a second terminal, first sidelink control information (SCI) on the identified resources on the PSCCH, and
        transmit, to the second terminal, second SCI and data on the identified resources for the PSSCH,
    wherein the processor is further configured to:
        map the second SCI, according to an order of an index for first frequency domain and then an index for time domain, and
        map the data to a resource being not used for the second SCI.

6. The first terminal of claim 5, wherein a number of resources in the frequency domain used for the second SCI is determined according to a number of bits for the second SCI.

7. The first terminal of claim 5 wherein the second SCI is mapped from a resource having a lowest index in the frequency domain.

8. The first terminal of claim 5 wherein the first SCI and the second SCI are associated with the PSSCH.

9. A method performed by a second terminal in a communication system, the method comprising:
    identifying resources for a physical sidelink control channel (PSCCH);
    identifying resources for a physical sidelink shared channel (PSSCH);
    receiving, from a first terminal, the first sidelink control information (SCI) on the identified resources for the PSCCH; and receiving, from the first terminal, second SCI and data on the identified resources for the PSSCH, wherein the second SCI is mapped, according to an order of an index for first frequency domain and then an index for time domain, and wherein the data is mapped to a resource being not used for the second SCI.

10. The method of claim 9, wherein a number of resources in the frequency domain used for the second SCI is determined according to a number of bits for the second SCI.

11. The method of claim 9, wherein the second SCI is mapped from a resource having a lowest index in the frequency domain, and wherein the first SCI and the second SCI are associated with the PSSCH.

12. A second terminal in a communication system, the second terminal comprising:

a transceiver; and a processor configured to:

identify resources for a physical sidelink control channel (PSCCH), identify resources for a physical sidelink shared channel (PSSCH), receive, from a first terminal, first sidelink control information (SCI) on the identified resources for the PSCCH, and receive, from the first terminal, second SCI and data on the identified resources for the PSSCH, wherein the second SCI is mapped, according to an order of an index for first frequency domain and then an index for time domain, and wherein the data is mapped to a resource being not used for the second SCI.

13. The second terminal of claim 12, wherein a number of resources in the frequency domain used for the second SCI is determined according to a number of bits for the second SCI.

14. The second terminal of claim 12, wherein the second SCI is mapped from a resource having a lowest index in the frequency domain.

15. The second terminal of claim 12, wherein the first SCI and the second SCI are associated with the PSSCH.

* * * * *